(12) United States Patent
Toba et al.

US010580208B2

(10) Patent No.: US 10,580,208 B2
(45) Date of Patent: Mar. 3, 2020

(54) CEILING MAP BUILDING METHOD, CEILING MAP BUILDING DEVICE, AND CEILING MAP BUILDING PROGRAM

(71) Applicant: HONDA MOTOR CO., LTD., Tokyo (JP)

(72) Inventors: Kaoru Toba, Wako (JP); Soshi Iba, Wako (JP); Yuji Hasegawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 96 days.

(21) Appl. No.: 16/055,456

(22) Filed: Aug. 6, 2018

(65) Prior Publication Data
US 2019/0051042 A1  Feb. 14, 2019

(30) Foreign Application Priority Data

Aug. 10, 2017 (JP) .................. 2017-156019

(51) Int. Cl.
| | |
|---|---|
| *G06K 9/00* | (2006.01) |
| *G06T 17/05* | (2011.01) |
| *G06T 7/246* | (2017.01) |
| *G06T 7/33* | (2017.01) |
| *G06T 7/215* | (2017.01) |

(Continued)

(52) U.S. Cl.
CPC ............ *G06T 17/05* (2013.01); *G06T 3/4038* (2013.01); *G06T 7/215* (2017.01); *G06T 7/246* (2017.01); *G06T 7/262* (2017.01); *G06T 7/33* (2017.01); *G06T 7/37* (2017.01); *G06T 7/62* (2017.01); *G06T 2200/32* (2013.01);
(Continued)

(58) Field of Classification Search
CPC .... C10M 2209/108; C10M 2209/1085; C10M 2209/107; C10M 2209/1075; C10M 2209/104; C10M 2209/1045; C10M 2209/105; C10M 2209/1055; C10M 169/041; C10M 173/02; C10M 2209/103; C10M 2209/1033; G06T 17/05; G06T 3/4038; G06T 7/215; G06T 7/262; G06T 7/37; G06T 7/62; G06T 2200/32; G06T 2207/10016; G06T 2207/10024; G06T 2207/30208; G06T 7/246; G06T 7/33; C10N 2220/022; C10N 2230/64; C10N 2240/10; C10N 2240/102
See application file for complete search history.

(56) References Cited

U.S. PATENT DOCUMENTS

2010/0070125 A1* 3/2010 Lee ...................... G05D 1/0253
701/28
2015/0379704 A1* 12/2015 Chandrasekar ....... G06T 7/0004
701/25

FOREIGN PATENT DOCUMENTS

JP  2004-133567  4/2004

\* cited by examiner

*Primary Examiner* — Tom Y Lu
(74) *Attorney, Agent, or Firm* — Rankin, Hill & Clark LLP

(57) ABSTRACT

A ceiling map building method includes estimating a scale of each ceiling image based on information related to the ceiling image and information related to another ceiling image including a same object as included in the ceiling image, the scale being represented as a ratio of an amount of movement of the object between the two ceiling images to an amount of movement of the camera (6) between the positions thereof when the two ceiling images were respectively captured (ST16), and building a ceiling map (2) (ST2) by converting the ceiling images in accordance with the respective scales so as to have sizes suitable for the ceiling map and combining the converted ceiling images (ST84).

10 Claims, 24 Drawing Sheets

(51) Int. Cl.
  *G06T 7/62* (2017.01)
  *G06T 7/262* (2017.01)
  *G06T 7/37* (2017.01)
  *G06T 3/40* (2006.01)
(52) U.S. Cl.
  CPC ............... *G06T 2207/10016* (2013.01); *G06T 2207/10024* (2013.01); *G06T 2207/30208* (2013.01)

(A)            (B)

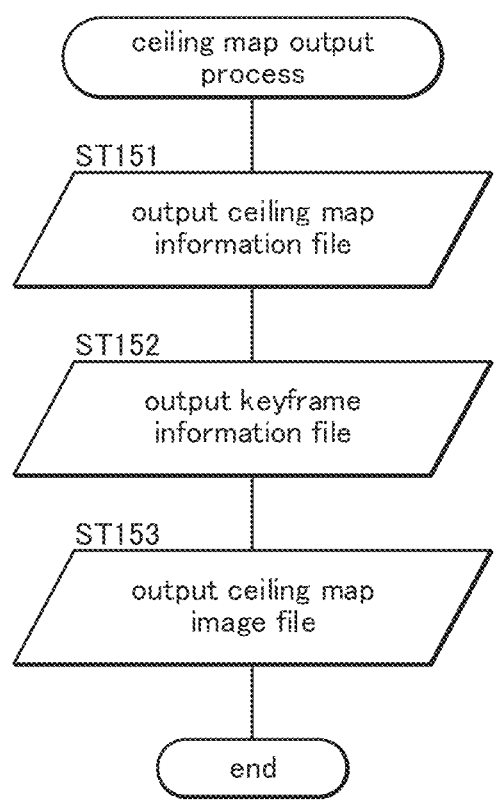

CEILING MAP BUILDING METHOD, CEILING MAP BUILDING DEVICE, AND CEILING MAP BUILDING PROGRAM

TECHNICAL FIELD

The present disclosure relates to a ceiling map building method, a ceiling map building device, and a ceiling map building program for building a ceiling map by combining a plurality of ceiling images produced by a camera configured to be movable along a floor surface.

BACKGROUND ART

JP2004-133567A discloses an autonomously movable mobile body including a camera configured to be capable of capturing images of a ceiling surface and a position detector configured to process the image data captured by the camera to detect a position of the mobile body, wherein the position detector stores beforehand reference image information including ceiling images captured at reference positions whose position information is known, and the mobile body captures an image of the ceiling with a camera and detects the position of the mobile body based on the captured ceiling image and the reference image information by performing image matching.

In the mobile body disclosed in JP2004-133567A, two cameras spaced apart from each other are used to capture stereo images of the ceiling to detect a distance from the mobile body to each object included in the captured images. The detected distance to each object is compared to the distance to the ceiling (the distance to the ceiling is given beforehand) to extract only portions (or pixels) of each captured image corresponding to the ceiling or a part near the ceiling (or to mask the pixels corresponding to objects other than the ceiling, such as a wall, a door, a desk, a cabinet, etc.).

In a case where the mobile body is used in a large facility, such as an airport, each ceiling image captured by the mobile body covers only a part of the ceiling of the operation area of the mobile body in the facility, and it may be desired to combine the ceiling images captured at various positions to form a mosaic image of the ceiling. Such a mosaic ceiling image should preferably have a uniform scale over the entire region thereof so that calculation of a distance in the mosaic ceiling image is easy. In the present disclosure, a mosaic ceiling image having a substantially uniform scale over the entire region thereof is referred to as a ceiling panorama map or, simply, a ceiling map. The ceiling map may be used by the mobile body that was used to build the ceiling map or another mobile body to detect or estimate the position thereof (or to localize the mobile body). However, the height of the ceiling from the floor (and hence from the mobile body) may differ from position to position in the facility, and therefore, the captured ceiling images, which typically have the same resolution (e.g., 1936×1216), may have different scales, where a "scale" can be represented by a number of pixels in the image corresponding to a unit length (e.g., one meter). Therefore, in order to build a ceiling map, it is necessary to adjust the sizes of the captured ceiling images according to the respective scales such that the adjusted images have a substantially same scale when combining them to form the ceiling map. However, the scales of the captured ceiling images are often unknown because the height of the ceiling from the floor at each image-capturing position is often unknown.

In order to determine the distance to the ceiling and to thereby determine the scale of each of the captured ceiling images, it may be conceived to capture the images as stereo images by use of two cameras, as in JP2004-133567A. However, using two cameras would make the system undesirably complicated.

SUMMARY OF THE INVENTION

In view of the above background, a primary object of the present invention is to provide a ceiling map building method, a ceiling map building device, and a ceiling map building program, which can build a ceiling map by combining ceiling images captured by a single camera movable along a floor surface, even when the distance to the ceiling is not known beforehand.

Means to Accomplish the Task

To achieve the above object, one aspect of the present invention provides a ceiling map building method for building a ceiling map, comprising: acquiring a plurality of ceiling images produced by capturing images of a ceiling (5) with a camera (6) while the camera is moved along a floor surface (2), and position information associated with each ceiling image, the position information indicating a position of the camera when the ceiling image was captured (ST11); estimating a scale of each ceiling image based on information related to the ceiling image and information related to another ceiling image including a same object as included in the ceiling image, the scale being represented as a ratio of an amount of movement of the object between the two ceiling images to an amount of movement of the camera between the positions thereof when the two ceiling images were respectively captured (ST16); and building a ceiling map (ST2) by converting the plurality of ceiling images in accordance with the respective scales so as to have sizes suitable for the ceiling map and combining the converted ceiling images (ST84).

According to this arrangement, it is possible to build a ceiling map by combining the captured ceiling images even when the distance to the ceiling is not known beforehand.

Preferably, in the above arrangement, the estimating of the scale (ST16) comprises: performing four kinds of scale estimation for each ceiling image based on matching between each ceiling image and the other ceiling image including the same object as included in the ceiling image using respective transformation matrices (ST75); and selecting, as the scale, a scale obtained by one of the multiple kinds of scale estimation associated with the transformation matrix that provides a highest template matching score (ST76).

According to this arrangement, it is possible to use different characteristics of different matching methods complementarily to thereby estimate the scale of each ceiling image with high accuracy.

Preferably, in the above arrangement, the plurality of scale estimation includes scale estimation using a homography matrix estimated by use of a result of corresponding point matching of local feature points.

According to this arrangement, it is possible to build a ceiling map by use of wider-angle images, and hence, by use of a smaller number of images.

Preferably, in the above arrangement, the plurality of scale estimation includes scale estimation using a rigid-body transformation matrix estimated by use of a result of corresponding point matching of local feature points.

According to this arrangement, it is possible to estimate the scale accurately when the ceiling has a uniform height.

Preferably, in the above arrangement, the plurality of scale estimation includes scale estimation using a translational transformation matrix (equation (2)) estimated by use of template matching.

According to this arrangement, it is possible to accurately estimate the scale even when the height of the ceiling varies.

Preferably, in the above arrangement, the plurality of scale estimation includes scale estimation using an inter-image translational transformation matrix (equation (5)) based on the scale of an immediately prior ceiling image.

According to this arrangement, it is possible to estimate the scale quickly with a small amount of computation when the height of the ceiling does not vary significantly.

Preferably, in the above arrangement, the estimating of the scale (ST16) includes performing a smoothing process on the scales of the plurality of ceiling images arranged in a time-sequential order with respect to image capturing times thereof (ST78).

According to this arrangement, it is possible to suppress an error in the scale estimation and allow the ceiling images to be combined more smoothly.

Preferably, in the above arrangement, the building of the ceiling map (ST2) comprises: dividing an area of the ceiling map into a plurality of blocks (ST83); calculating an affine transformation matrix of each ceiling image for transformation from an image coordinate system to a ceiling map coordinate system (ST121); and pasting, to each block of the ceiling map, a ceiling image that is located closest to a center coordinate of the block when subjected to transformation by the affine transformation matrix (ST123).

According to this arrangement, portions of the ceiling images whose shooting direction is near vertical are combined, whereby a ceiling panorama map with a reduced distortion is built.

Further, to achieve the above object, another aspect of the present invention provides, a ceiling map building device (10) for building a ceiling map, comprising a processor and a memory storing instructions that, when executed by the processor, cause the processor to perform operations comprising: acquiring a plurality of ceiling images produced by capturing images of a ceiling (5) with a camera (6) while the camera is moved along a floor surface (2), and position information associated with each ceiling image, the position information indicating a position of the camera when the ceiling image was captured (ST11); estimating a scale of each ceiling image based on information related to the ceiling image and information related to another ceiling image including a same object as included in the ceiling image, the scale being represented as a ratio of an amount of movement of the object between the two ceiling images to an amount of movement of the camera between the positions thereof when the two ceiling images were respectively captured (ST16); and building the ceiling map (ST2) by converting the plurality of ceiling images in accordance with the respective scales so as to have sizes suitable for the ceiling map and combining the converted ceiling images (ST84).

According to this arrangement, it is possible to build a ceiling map by combining the captured ceiling images even when the distance to the ceiling is not known beforehand.

Further, to achieve the above object, another aspect of the present invention provides a non-transitory computer readable storage medium storing a ceiling map building program for building a ceiling map, wherein, when executed by a computer, the program causes the computer to perform operations comprising: acquiring a plurality of ceiling images produced by capturing images of a ceiling (5) with a camera (6) while the camera is moved along a floor surface (2), and position information associated with each ceiling image, the position information indicating a position of the camera when the ceiling image was captured (ST11); estimating a scale of each ceiling image based on information related to the ceiling image and information related to another ceiling image including a same object as included in the ceiling image, the scale being represented as a ratio of an amount of movement of the object between the two ceiling images to an amount of movement of the camera between the positions thereof when the two ceiling images were respectively captured (ST16); and building the ceiling map (ST2) by converting the plurality of ceiling images in accordance with the respective scales so as to have sizes suitable for the ceiling map and combining the converted ceiling images (ST84).

According to this arrangement, it is possible to build a ceiling map by combining the captured ceiling images even when the distance to the ceiling is not known beforehand.

Thus, according to an aspect of the present invention, it is possible to build a ceiling map by combining ceiling images captured by a single camera movable along a floor surface, even when the distance to the ceiling is not known beforehand.

BRIEF DESCRIPTION OF THE DRAWINGS

FIG. 24 is a flowchart showing a procedure of a ceiling map output process.

DESCRIPTION OF THE PREFERRED EMBODIMENT(S)

In the following, a preferred embodiment of the present invention will be described in detail with reference to the drawings.

<<Overall Configuration>>

Figure 1:
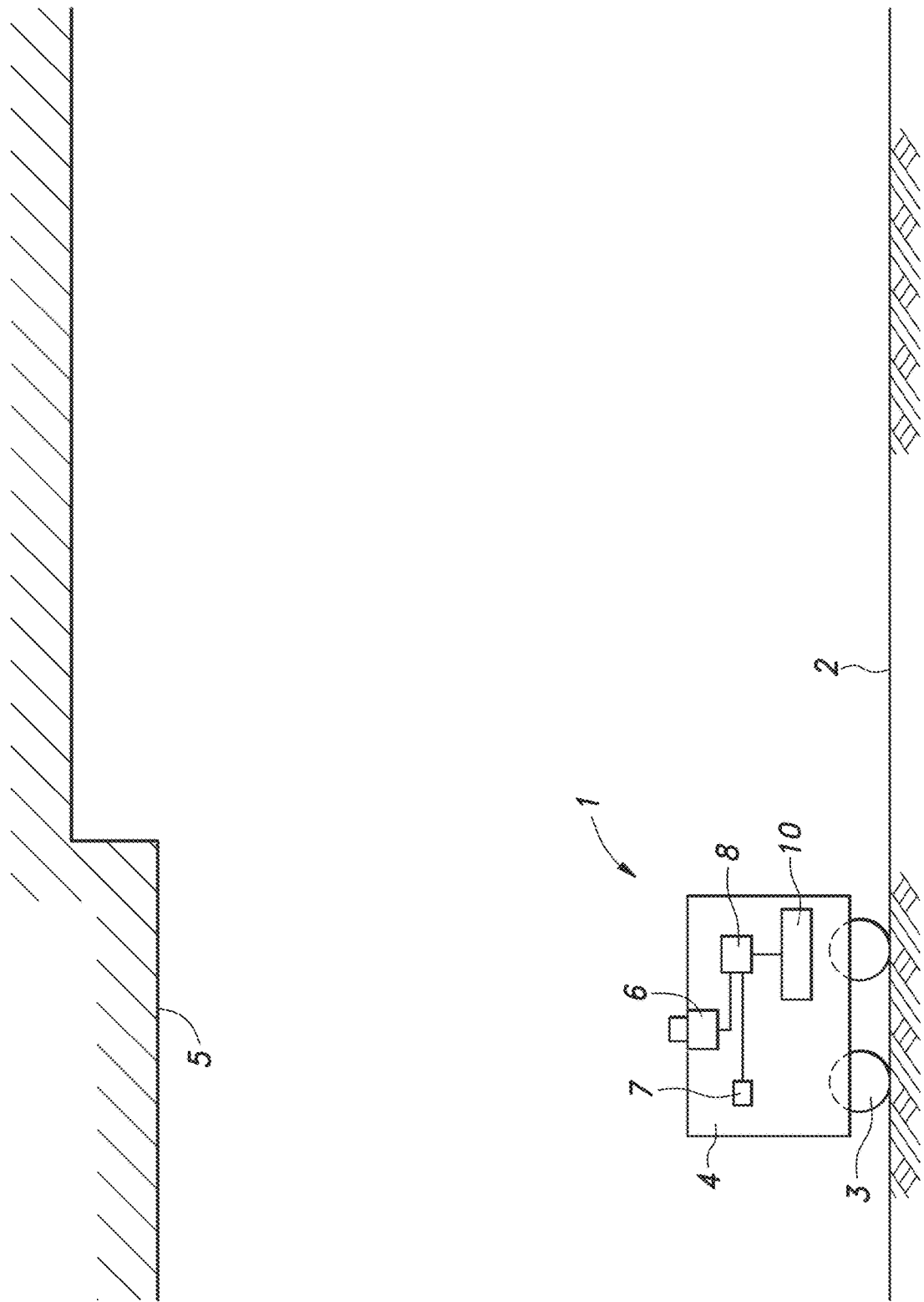
FIG. 1 is a schematic configuration diagram showing a ceiling map building unit according to a preferred embodiment of the invention.

FIG. 1 is a schematic configuration diagram showing an exemplary ceiling map building unit 1. As shown in FIG. 1, the ceiling map building unit 1 is embodied as a mobile body 4 having traveling wheels 3 so as to be movable on a floor surface 2. The mobile body 4 may be configured to be capable of autonomously traveling on the floor surface 2 or may be configured to travel on the floor surface 2 by being pulled by another device or a person. Also, the mobile body 4 may be configured as a walking robot having legs instead of the traveling wheels 3. The mobile body 4 has a fisheye lens camera 6 (simply referred to as a camera 6 hereinafter), which is an electronic camera (or digital camera) with a single fisheye lens, mounted thereon as an imaging device for capturing images of a ceiling 5. Further, the mobile body 4 is equipped with a position and orientation detection unit 7 for detecting the position and orientation of the camera 6 in a world coordinate system. The position and orientation detection unit 7 includes a GPS (Global Positioning System) sensor for detecting the position in the world coordinate system with a high accuracy, and a gyro sensor for detecting the orientation of the camera 6 from an angular velocity of the camera 6.

The mobile body 4 is provided with a storage device 8 for storing files of ceiling images captured by the camera 6, and the position information and orientation information (hereinafter, position/orientation information) of the camera 6 detected by the position and orientation detection unit 7 when capturing each ceiling image. Further, the mobile body 4 is provided with a ceiling map building device 10 configured to build a ceiling map based on the ceiling image files and the position/orientation information stored in the storage device 8. The storage device 8 and the ceiling map building device 10 do not have to be necessarily mounted on the mobile body 4, and may be placed at a position remote from the mobile body 4. In such a case, the storage device 8 and the ceiling map building device 10 may be configured to receive data wirelessly or with wire from the devices mounted on the mobile body 4 such as the camera 6 and the position and orientation detection unit 7.

The ceiling map building device 10 is embodied by a computer constituted of an electronic circuit unit including a CPU, a RAM, a ROM, etc. The ceiling map building device 10 is configured to perform various processes to build a ceiling map based on the ceiling image files and the position/orientation information. More specifically, the processor (CPU) constituting the ceiling map building device 10 is programmed to read necessary data from the storage device 8, and read in appropriate application software stored in the ROM to perform prescribed processes according to the software.

Figure 2:
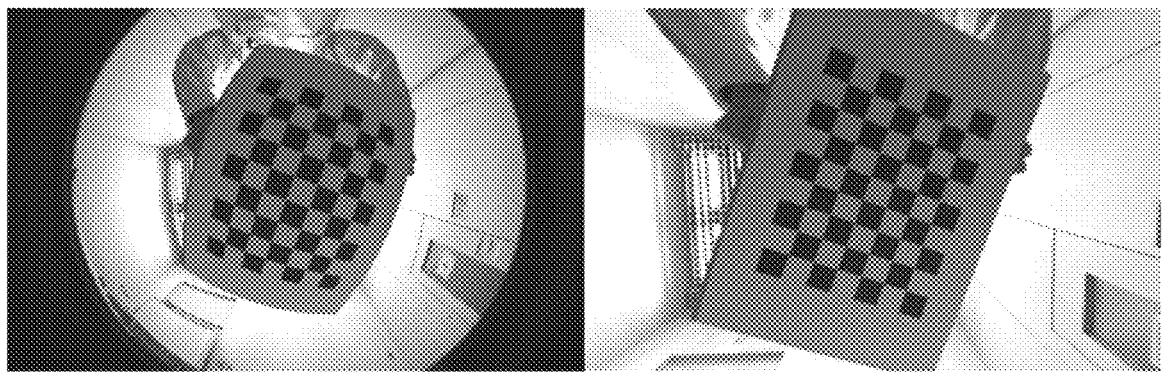
FIG. 2 is a diagram for explaining camera calibration; (A) an exemplary captured image before calibration; (B) an exemplary captured image after calibration.

The ceiling map building device 10 has a camera calibration function. Specifically, before capturing images of the ceiling 5 with the camera 6, the ceiling map building device 10 performs camera calibration to estimate internal parameters and a distortion coefficient vector of the camera 6 as camera parameters of the camera 6 using a fisheye lens. First, as a preliminary process of the camera calibration, a plurality of chess board images each obtained by capturing an image of a chess board by use of a fisheye lens are prepared, an example of which is shown in part (A) of FIG. 2. In order to estimate the camera parameter, it is typically necessary to prepare several tens to several hundreds of chess board images.

In the camera calibration, corners of the chess board are detected in each of the chess board images for camera calibration. The detection of the chess board corners is performed with an accuracy of sub-pixels. After the corner detection, the internal parameters and the distortion coefficient vector of the camera 6 is estimated by a known method based on the result of the corner detection of the all chess board images. The internal parameters and the distortion coefficient vector of the camera 6 thus obtained are recorded in a camera parameter file. By use of the internal parameters and the distortion coefficient vector of the camera 6, it is possible to correct the distortion of an image captured by use of the fisheye lens, as shown in part (2) of FIG. 2. In the following description, the ceiling images indicate those after the distortion correction when not mentioned otherwise.

<<Ceiling Image Capturing>>

Figure 3:
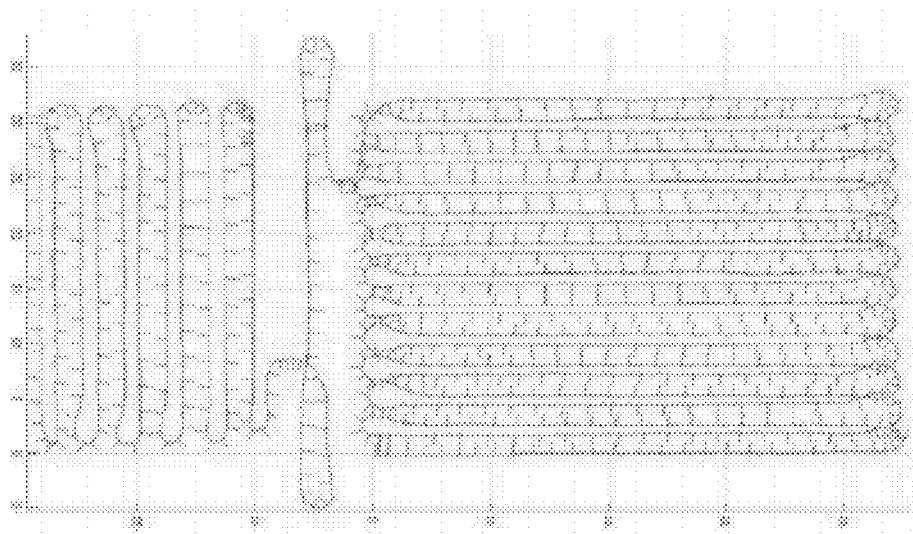
FIG. 3 is an image diagram schematically illustrating exemplary information contained in a position/orientation information file.

The capturing of images of the ceiling 5 by the camera 6 is performed as follows. The camera 6 is mounted on the mobile body 4 so as to face the ceiling 5, and the mobile body 4 is moved along the floor surface so that the ceiling 5 is scanned by the camera 6. While the mobile body 4 is being moved, the position and orientation detection unit 7 detects the position and orientation of the camera 6, and the camera 6 captures images of the ceiling 5. Thereby, a plurality of ceiling image files are created, and a position/orientation information file containing temporal changes of the position and orientation of the camera 6 capturing the images is created. Further, a time stamp information file containing time stamp information indicating the time at which each image was captured is created. The time stamp information links the position/orientation information to the file names of the ceiling image files, whereby each ceiling image is associated with the position/orientation of the camera 6 when the camera captured the ceiling image. FIG. 3 is an image diagram schematically illustrating exemplary information contained in the position/orientation information file. As shown in FIG. 3, the mobile body 4 is moved as indicated by a solid line, and the position information and the orientation information of the camera 6 that captured the images are represented on the moving line (trajectory) of the mobile body 4 with respect to the world coordinate system.

<<Ceiling Map Building>>

Next, description will be made of the ceiling map building function of the ceiling map building device 10. When causing the ceiling map building device 10 to perform the ceiling map building function, the internal parameters and the distortion coefficient vector of the camera 6, the ceiling image files, the position/orientation information file, and the time stamp information file are prepared beforehand (step ST00, not shown in the drawings), and the information of these files is input to the ceiling map building device 10 as input data. Further, a settings file for ceiling map building, in which parameters necessary for the process, such as a ceiling map size and the number of times bundle adjustment is to be performed, are contained is also prepared, and the information of the settings file for ceiling map building is input to the ceiling map building device 10 as settings data.

Figure 4:
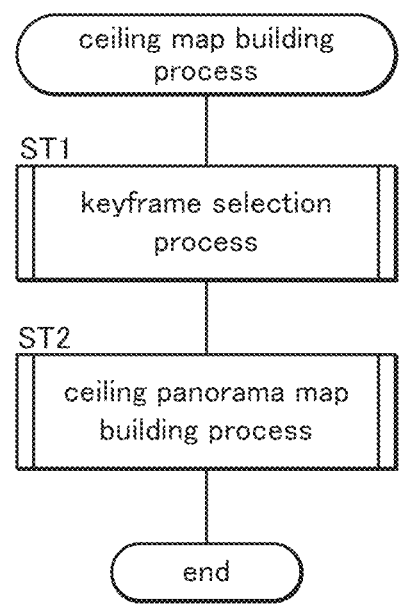
FIG. 4 is a flowchart showing a procedure of a ceiling map building process.

FIG. 4 is a flowchart showing a procedure of the ceiling map building process performed by the ceiling map building device 10. As shown in FIG. 4, the ceiling map building process contains two phases; a keyframe selection process (step ST1) and a ceiling panorama map building process (step ST2).

<<Keyframe Selection Process>>

In the following, description will be made of the keyframe selection process of step ST1 in FIG. 4. To paste a plurality of ceiling images onto a common ceiling map coordinate system appropriately to build a ceiling map (or synthesize the ceiling images into a ceiling map), it is necessary to determine where in the ceiling map each ceiling image should be positioned and how the properties (such as a size) of each ceiling image should be adjusted. To determine either of them, it is necessary to estimate the scale of each ceiling image (which may be also referred to as a local scale). As will be described in detail later, in the present embodiment, the scale of each ceiling image is obtained based on a translation between the ceiling image and a nearby ceiling image in the image coordinate system and a translation between the two ceiling images in the world coordinate system (or a distance between the corresponding image-capturing positions) which can be obtained from the position/orientation information.

It is to be noted that in the present disclosure, a translation between two images in the image coordinate system is defined as an amount of movement (difference vector) of a same object included in the two ceiling images. On the other hand, a translation between two images in the world coordinate system is defined as an amount of movement (difference vector) of the camera 6 between the positions where the two ceiling images were captured. Further, a scale of an image is defined as a value indicating how many pixels something moves in the image (or in the ceiling map coordinate system) when it moves one meter in the world coordinate system, and thus has a unit of "pixel/meter." Therefore, when a same object is included in (or shared by) two ceiling images and this object is moved by a certain amount (pixels) between the two ceiling images in response to the movement of the camera 6 for capturing the two ceiling images, the scale can be obtained as a ratio of the amount of movement (pixels) of the object between the two images to the amount of movement (meters) of the camera between the corresponding image-capturing positions.

Incidentally, if the process of estimating the local scale is performed for the all ceiling images, it may require a huge amount of computation, particularly when the number of the images is in the order of thousands to tens of thousands. On the other hand, it is often the case that the ceiling 5 has a uniform height when a limited area is considered, and therefore, adjoining ceiling images typically have a substantially same scale. Thus, to reduce the amount of computation and estimate the scales of the ceiling images efficiently, it is considered preferable to thin out the ceiling images for which the estimation of the scale is performed, without estimating the scale for all of the ceiling images. In the present embodiment, representative ceiling images remaining after thinning out the ceiling images are referred to as keyframes, and the local scale is estimated for each keyframe.

To estimate the local scales for the keyframes with high accuracy, it is necessary to select ceiling images serving as the keyframes such that, for each keyframe (i.e., for each selected ceiling image), there is another keyframe that is located near the keyframe and that includes a same object as included in the keyframe. In the present disclosure, a pair of ceiling images (or keyframes) that include a same (or common) object therein are referred to as having a "covisibility" relationship with each other. The requirement for each keyframe to have another keyframe having a covisibility relationship therewith is provided for preventing two ceiling images that are near each other but are actually not continuous to each other (such as when the two ceiling images are located on opposite sides of a wall) from being selected as keyframes. In the present embodiment, local feature point matching is performed between the ceiling images, and if a ratio of a number of corresponding points between two images to a number of feature points of these images is large, the two images are regarded as having a covisibility relationship. In the present embodiment, the local scale is estimated based on the translation between the keyframes having a covisibility relationship.

The local feature point matching may be performed using a known algorithm. For example, algorithms described in H. Strasdat, A. J. Davion, J. M. M. Montiel, K. Konolige, "Double Window Optimisation for Constant Time Visual SLAM," 2011 or Raul Mur-Artal, J. M. M. Montiel, Juan D. Tardos, "ORB-SLM: a Versatile and Accurate Monocular Slam System," 2015 may be used. Here, matching is performed by use of feature points extracted by use of an ORB (Oriented FAST and Rotated BRIEF) algorithm (hereinafter, the feature points will be referred to as ORB feature points).

Figure 5:
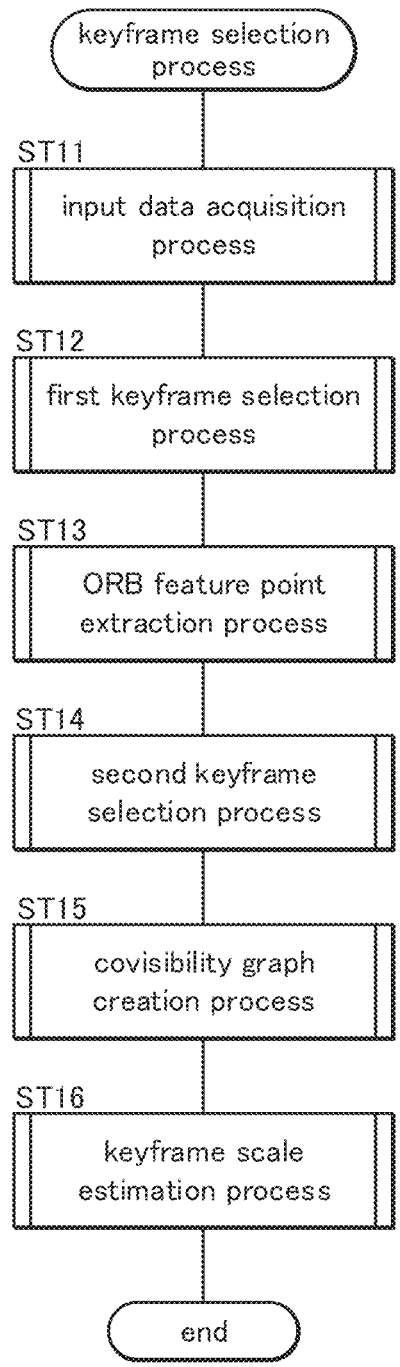
FIG. 5 is a flowchart showing a procedure of a keyframe selection process.

FIG. 5 is a flowchart showing a procedure of the keyframe selection process of step ST1 in FIG. 4. In the keyframe selection process, the ceiling map building device 10 performs various processes shown in FIG. 5. Specifically, the ceiling map building device 10 performs: an input data acquisition process (step ST11); a first keyframe selection process (step ST12) in which, of the ceiling images contained in the acquired input data, a plurality of ceiling images serving as initial keyframes are selected; an ORB feature point extraction process (step ST13) in which ORB feature points are extracted from the selected initial keyframes; a second keyframe selection process (step ST14) in which the initial keyframes are thinned out to select a plurality of final keyframes; a covisibility graph creation process (step ST15) for creating a covisibility graph in which keyframes having a covisibility relationship are connected with each other; and a keyframe scale estimation process for estimating the scale of each keyframe (step ST16). Then, the keyframe selection process is terminated.

In the following, the processes in steps ST11 to ST16 will be described in detail.

<Input Data Acquisition Process>

Figure 6:
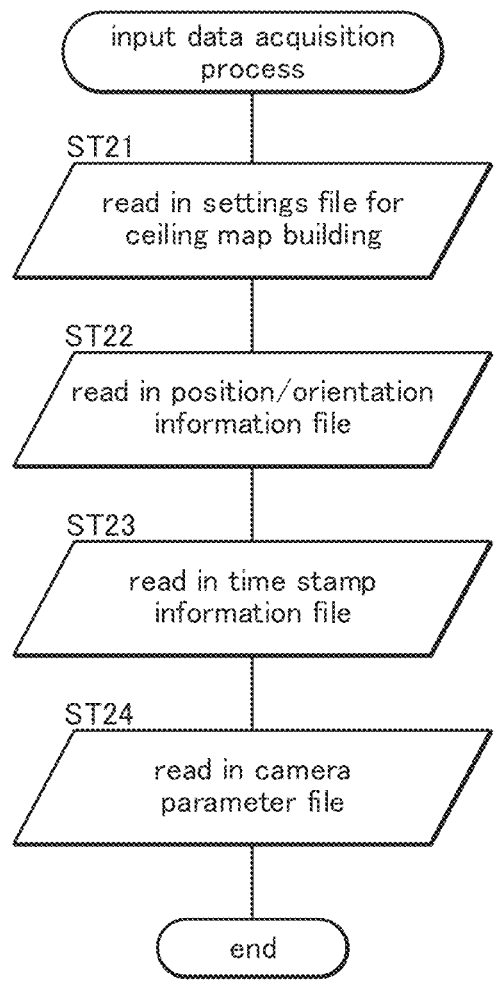
FIG. 6 is a flowchart showing a procedure of an input data acquisition process.

FIG. 6 is a flowchart showing a procedure of the input data acquisition process of step ST11 in FIG. 5. As shown in FIG. 6, in the input data acquisition process, the ceiling map building device 10 reads in the settings file for ceiling map building (step ST21), the position/orientation information file (step ST22), the time stamp information file (step ST23), and the camera parameter file (step ST24).

<First Keyframe Selection Process>

Figure 7:
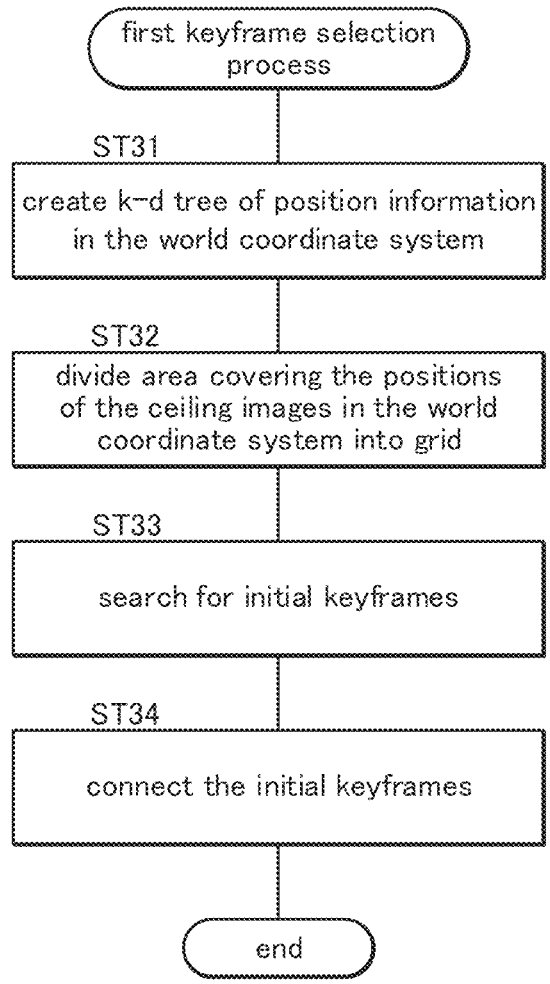
FIG. 7 is a flowchart showing a procedure of a first keyframe selection process.

FIG. 7 is a flowchart showing a procedure of the first keyframe selection process of step ST12 in FIG. 5. In the first keyframe selection process, in order to accelerate the calculation of the keyframe search, the ceiling map building device 10 creates a k-d tree (k dimension tree) of position information of the ceiling images in the world coordinate system (step ST31), and divides an area covering the positions of the ceiling images in the world coordinate system into a grid including a plurality of cells (step ST32). Here, the area is divided into cells by grid lines spaced from one another by 0.15 to 0.50 meters depending on the height of the ceiling 5 and a desired scale. Then, the ceiling map building device 10 searches for a ceiling image in each cell formed in step ST32 by use of the k-d tree, so that if a ceiling image is found in a cell, the ceiling image is selected as an initial keyframe (step ST33). If a plurality of ceiling images are found in one cell, a ceiling image having a position closest to the center of the cell is selected as an initial keyframe. The ceiling map building device 10 creates a graph map by connecting the initial keyframes in a time-sequential order (step ST34).

Figure 8:
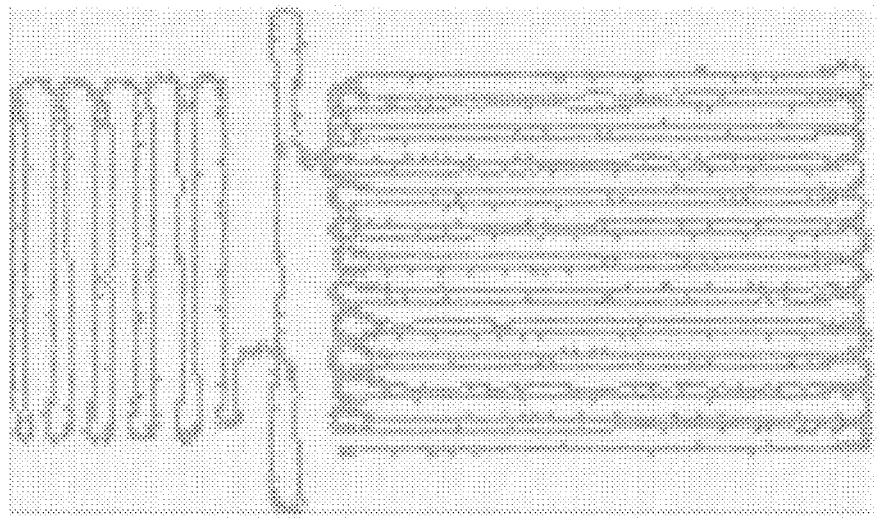
FIG. 8 is an image diagram schematically illustrating an example of a graph map.

FIG. 8 is an image diagram schematically illustrating an example of the graph map in which the initial keyframes are connected in a time-sequential order. The graph map shown in FIG. 8 was created based on the information contained in the position/orientation information file shown in FIG. 3.

<ORB Feature Point Extraction Process>

Figure 9:
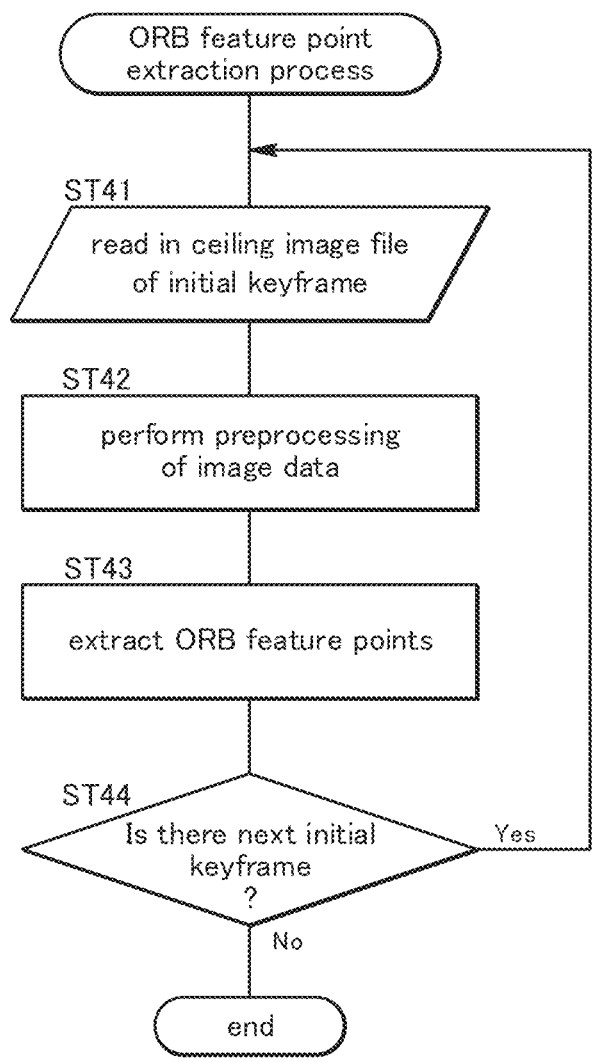
FIG. 9 is a flowchart showing a procedure of an ORB feature point extraction process.

FIG. 9 is a flowchart showing a procedure of the ORB feature point extraction process of step ST13 in FIG. 5. In the ORB feature point extraction process, the ceiling map building device 10 performs ORB feature point extraction for each of the initial keyframes by following the procedure shown in FIG. 9. The ceiling map building device 10 reads in the ceiling image file of an initial keyframe (step ST41), and performs preprocessing of the image data (step ST42). Specifically, the ceiling map building device 10 reduces the size of the image to the size specified by the settings file for ceiling map building. Further, the ceiling map building device 10 converts the image to an HSV color space (also referred to as an HSB color space), which is a color space having three components; namely, hue, saturation, and value (brightness), and levels the brightness to emphasize the contrast. Thereafter, the ceiling map building device 10 extracts ORB feature points (step ST43). The ORB feature point extraction may be performed by a known method disclosed in E. Rublee, V. Rabaud, K. Konolige, G. Bradski, "ORB: an efficient alternative to SIFT or SURF," 2011, for example. Then, the ceiling map building device 10 determines whether there is a next initial keyframe (step ST44), and if there is (Yes), repeats the above procedure from step ST41, and if not (No), terminates the process.

<Second Keyframe Selection Process (Thinning-out of Initial Keyframes)>

Figure 10:
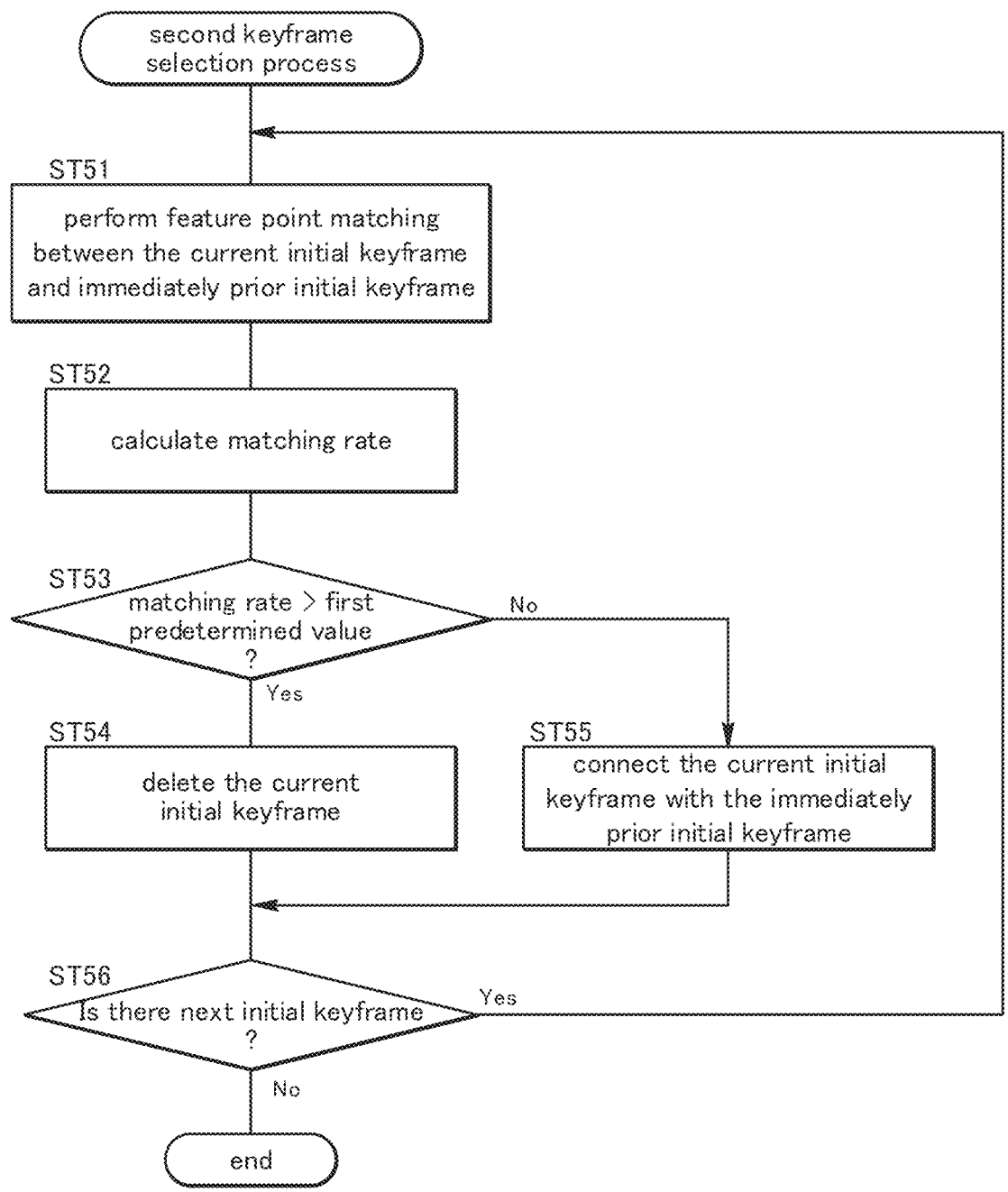
FIG. 10 is a flowchart showing a procedure of a second keyframe selection process.

FIG. 10 is a flowchart showing a procedure of the second keyframe selection process of step ST14 in FIG. 5. In the second keyframe selection process, the ceiling map building device 10 determines whether each of the initial keyframes should be selected (or retained) as a final keyframe in a time-sequential order by following the procedure shown in FIG. 10. First, the ceiling map building device 10 performs feature point matching between the current initial keyframe and an immediately prior initial keyframe (step ST51). It is to be noted that, at the start of the second keyframe selection process, the current initial keyframe may be the second keyframe in the time-sequential order and the immediately prior keyframe may be the first keyframe in the time-sequential order. Then, the ceiling map building device 10 calculates a matching rate defined by the following equation (1) (step ST52):

(matching rate)=2×(number of corresponding points)×100/((number of feature points of the current keyframe)+(number of feature points of immediately prior keyframe)) (1)

Subsequently, the ceiling map building device 10 determines whether to select the current initial keyframe as a final keyframe in accordance with the calculated matching rate. Specifically, the ceiling map building device 10 determines whether the matching rate is greater than a first predetermined value (e.g., 18%) (step ST53), and if the matching rate is greater than the first predetermined value (Yes), deletes the current initial keyframe (step ST54), and if the matching rate is equal to or less than the first predetermined value (No), selects the current initial keyframe as a final keyframe and connect it with the immediately prior initial keyframe (which has been already selected as a final keyframe) to create a graph map (step ST55). Thereafter, the ceiling map building device 10 determines whether there is a next initial keyframe (step ST56), and if there is (Yes), repeats the above procedure from step ST51, and if not (No), terminates the process. Thereby, the initial keyframes are thinned out, and the remaining initial keyframes serve as the final keyframes. In the following description, the final keyframes may be simply referred to as keyframes.

Figure 11:
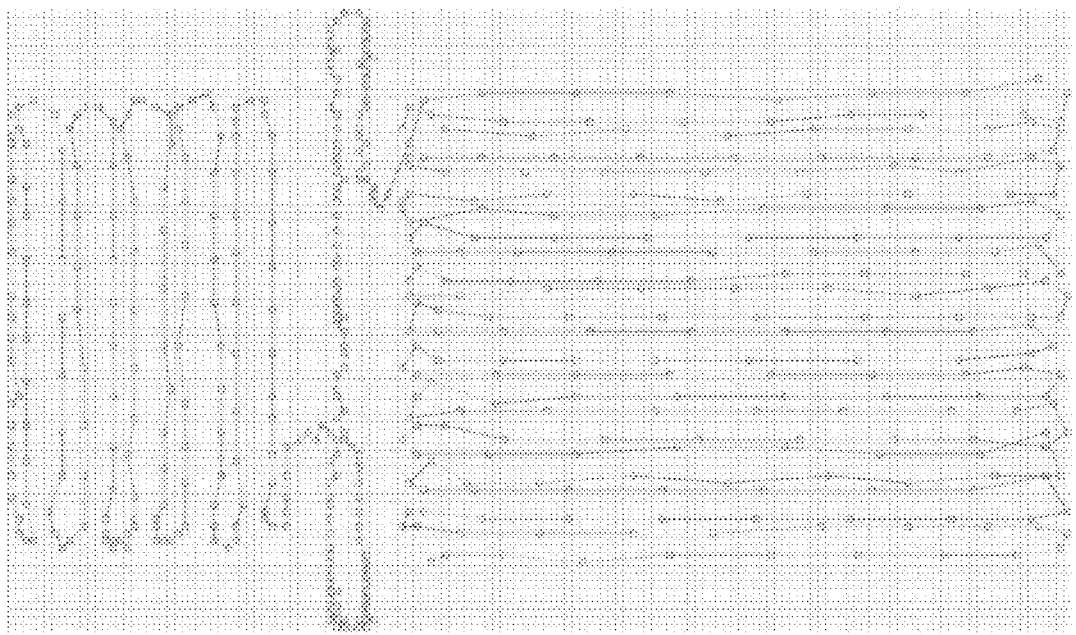
FIG. 11 is an image diagram schematically illustrating an example of a graph map of keyframes.

FIG. 11 is an image diagram schematically illustrating an example of the graph map in which the keyframes remaining after the initial keyframes have been thinned out in the second keyframe selection process are connected in a time-sequential order.

<Covisibility Graph Creation Process>

Figure 12:
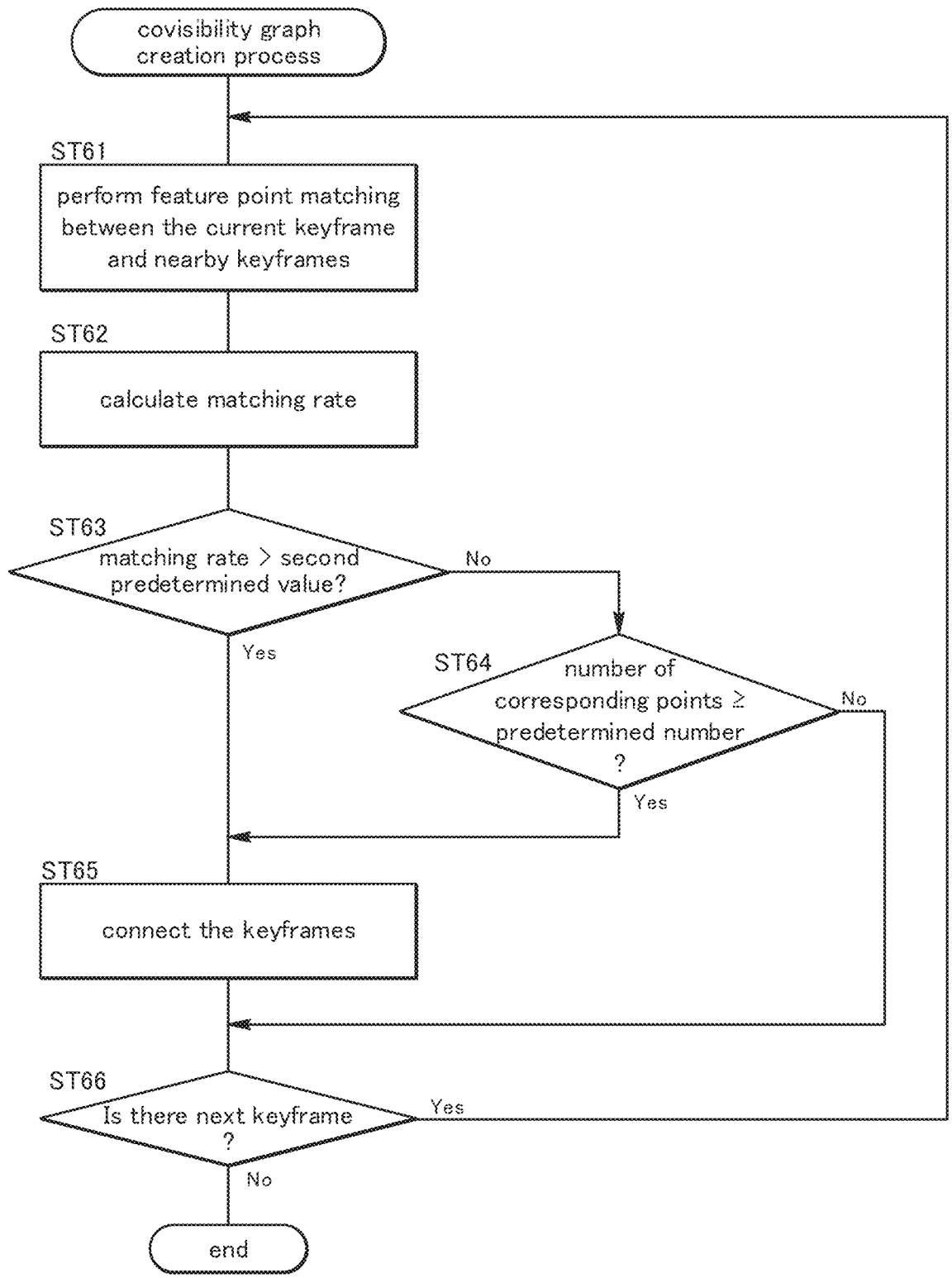
FIG. 12 is a flowchart showing a procedure of a covisibility graph creation process.

FIG. 12 is a flowchart showing a procedure of the covisibility graph creation process of step ST15 in FIG. 5. In the covisibility graph creation process, the ceiling map building device 10 performs the following process for the all keyframes remaining after the initial keyframes have been thinned out. First, the ceiling map building device 10 identifies keyframes in the vicinity of the current keyframe (e.g., keyframes present within 3 m from the current keyframe) and performs feature point matching between the current keyframe and each of the identified nearby keyframes, in order from the one closest to the current keyframe to the one furthest from the current keyframe (step ST61). Then, the ceiling map building device 10 calculates the matching rate between the current keyframe and each of the nearby keyframes by use of the above equation (1) (step ST62), determines whether the calculated matching rate is greater than a second predetermined value smaller than the first predetermined value (e.g., 5%) (step ST63), and if the matching rate is less than or equal to the second predetermined value (No), determines whether the number of corresponding points is greater than or equal to a predetermined number (e.g., 150) (step ST64). If the matching rate is greater than the second predetermined value (step ST63: Yes) or if the number of corresponding points is greater than or equal to the predetermined number (step ST64: Yes), the ceiling map building device 10 determines that the current keyframe and the nearby keyframe share one or more "covisible" objects or are in a covisibility relationship and connect them with each other (step ST65). If the matching rate is less than or equal to the second predetermined value (step ST63: No) and the number of corresponding points is less than predetermined number (step ST64: No), the ceiling map building device 10 does not connect the current keyframe with the nearby keyframe as not having a covisibility relationship. Thereafter, the ceiling map building device 10 determines whether there is a next keyframe (step ST66), and if there is (Yes), repeats the above procedure from step ST61, and if not (No), terminates the process. Thereby, a covisibility graph is created.

Figure 13:
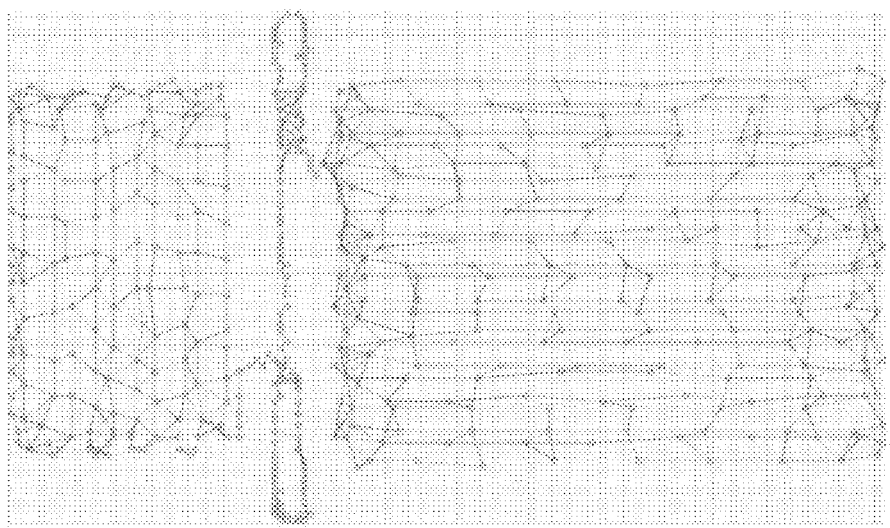
FIG. 13 is an image diagram schematically illustrating an example of a covisibility graph.

FIG. 13 is an image diagram schematically illustrating an example of the covisibility graph created by the covisibility graph creation process. In the covisibility graph, nearby keyframes having a covisibility relationship are connected with each other.

<Keyframe Scale Estimation Process>

Figure 14:
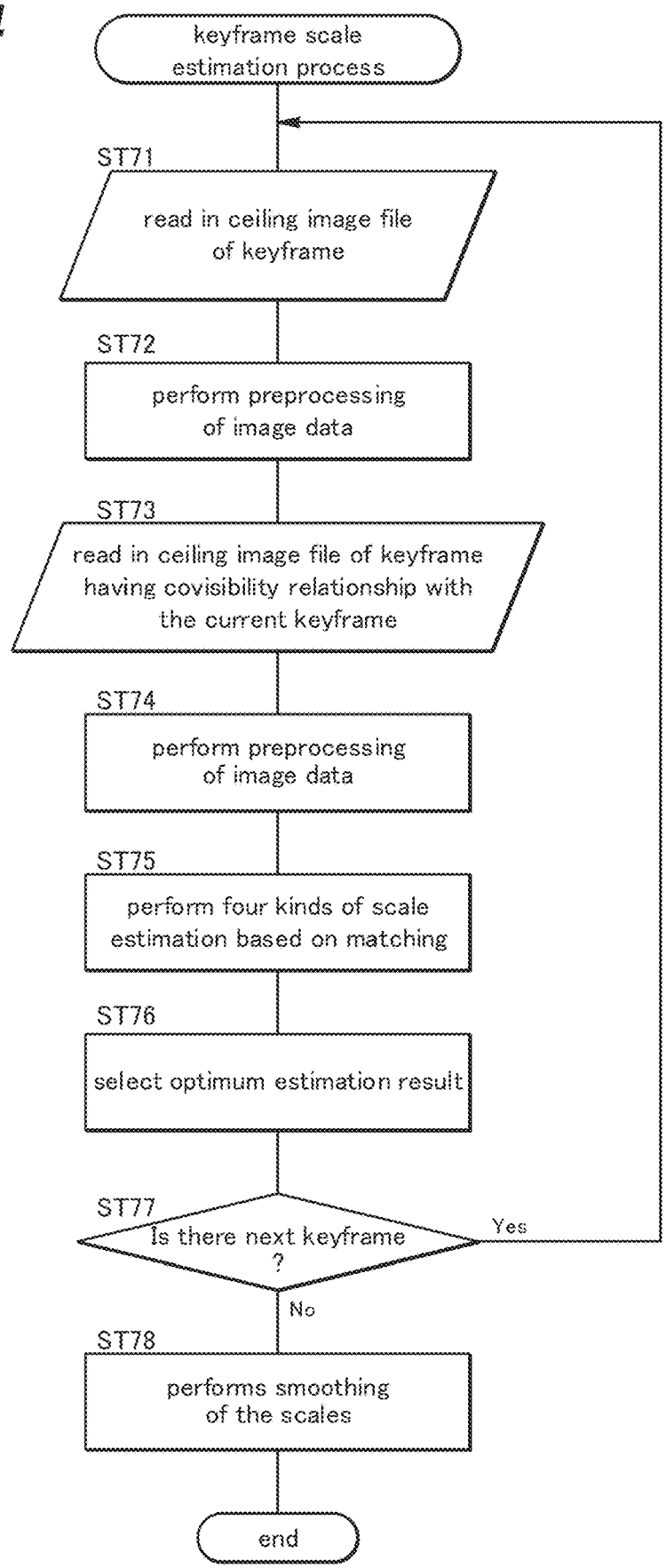
FIG. 14 is a flowchart showing a procedure of a keyframe scale estimation process.

FIG. 14 is a flowchart showing a procedure of the keyframe scale estimation process of step ST16 in FIG. 5. In the keyframe scale estimation process, the ceiling map building device 10 performs the below-explained process for all of the keyframes by following the procedure shown in FIG. 14. First, the ceiling map building device 10 reads in the ceiling image file of a keyframe (step ST71), and performs preprocessing of image data of the read-in ceiling image file (step ST72). Specifically, as in step ST42, the ceiling map building device 10 reduces the size of the image to the specified size, converts the image to an HSV color space, and levels the brightness to adjust the contrast. Thereafter, the ceiling map building device 10 rotates the image about the center thereof by an angle −θ, where θ represents the orientation of the mobile body 4 obtained from the orientation information, to thereby align the orientation of the image to a prescribed direction. Owing to this process, when performing matching between the images within the range of approximation, it is necessary to process only information related to translation, without caring about rotation. After the preprocessing of the image data, the ceiling map building device 10 reads in the ceiling image file of a keyframe which was determined to have a covisibility relationship with the current keyframe (step ST73), and as in step ST72, performs preprocessing of the image data of the read-in ceiling image file (step ST74).

Subsequently, the ceiling map building device 10 estimates the scale of the current keyframe by performing four kinds of scale estimation based on matching between the current keyframe and the keyframe having a covisibility relationship with the current keyframe (step ST75). Specifically, the ceiling map building device 10 calculates the following first to fourth transformation matrices between these keyframes.

The first transformation matrix is a 3 by 3 homography matrix estimated by use of a result of corresponding point matching of local feature points. For the estimation of the homography matrix, OpenCV cv::findHomography function may be used, for example. By using the homography matrix, it is possible to build a ceiling map by use of wider-angle images, and hence, by use of a smaller number of images.

The second transformation matrix is a 3 by 3 rigid-body transformation matrix estimated by use of a result of corresponding point matching of local feature points. For the estimation of the rigid-body transformation matrix, OpenCV cv::estimateRigidTransform function may be used, for example. By using the rigid-body transformation matrix, it is possible to estimate the scale accurately when the ceiling 5 has a uniform height.

The third transformation matrix is a translational transformation matrix estimated by use of template matching. When a translation between images in the image coordinate system obtained by template matching is given by (ΔX, ΔY), the inter-image translational transformation matrix is given by the following equation (2):

$$\begin{pmatrix} 1 & 0 & \Delta X \\ 0 & 1 & \Delta Y \\ 0 & 0 & 1 \end{pmatrix} \quad (2)$$

By use of the translational transformation matrix estimated by using template matching, it is possible to accurately estimate the scale even when the height of the ceiling 5 varies.

The fourth transformation matrix is a translational transformation matrix estimated based on the scale of the immediately prior keyframe. Assuming that the scale of the immediately prior keyframe is $s_{prev}$, and a deviation of the orientation of the camera 6 relative to the orientation of the mobile body 4 is −ψ, the transformation matrix from the world coordinate system to the image coordinate system is given by the following equation (3):

$$s_{prev}\begin{pmatrix} \cos\varphi & -\sin\varphi \\ \sin\varphi & \cos\varphi \end{pmatrix} \quad (3)$$

Therefore, by use of the translation (Δx, Δy) in the world coordinate system, the translation (ΔX, ΔY) between the keyframes is given by the following equation (4):

$$\begin{pmatrix} \Delta X \\ \Delta Y \end{pmatrix} = s_{prev}\begin{pmatrix} \cos\varphi & -\sin\varphi \\ \sin\varphi & \cos\varphi \end{pmatrix}\begin{pmatrix} \Delta x \\ \Delta y \end{pmatrix} \quad (4)$$

Thus, as in the third transformation matrix, the inter-image translational transformation matrix is given by the following equation (5):

$$\begin{pmatrix} 1 & 0 & \Delta X \\ 0 & 1 & \Delta Y \\ 0 & 0 & 1 \end{pmatrix} \quad (5)$$

By use of the translational transformation matrix estimated based on the scale of the immediately prior keyframe, it is possible to estimate the scale quickly with a small amount of computation when the height of the ceiling 5 does not vary significantly.

Thus, in the present embodiment, multiple kinds of transformation matrices are calculated. One reason for this is because different matching methods have different characteristics; for example, accuracy of local feature point matching is high in an area including many features, while template matching is effective in an area including few features, and the calculation of multiple kinds of transformation matrices allows the transformation matrices to be used complementarily. Thereby, a scale of ceiling images (keyframes) having a covisibility relationship with one another can be estimated with high accuracy.

Thereafter, the ceiling map building device 10 selects one of the transformation matrices between the two images calculated in step ST75 as an optimum transformation matrix to be adopted (step ST76). Specifically, the ceiling map building device 10 applies each transformation matrix to one of the images and extracts a central part of the image, extracts a central part of the other image to have the same size, and performs template matching therebetween. Then, the ceiling map building device 10 selects the transformation matrix providing the highest matching score, and regards the scale obtained from the selected transformation matrix as a local scale s of the keyframes.

It is to be noted here that, by using the translation (ΔXc, ΔYc) in the image coordinate system obtained by applying the optimum transformation matrix selected in step ST75 to the image center and the translation (Δx, Δy) between the keyframes in the world coordinate system, the scale s is calculated by the following equation (6):

$$s = \frac{\sqrt{(\Delta X_c)^2 + (\Delta Y_c)^2}}{\sqrt{(\Delta x)^2 + (\Delta y)^2}} \qquad (6)$$

In many facilities or buildings, the ceiling is substantially parallel with the floor, and hence, the translation between keyframes is often well represented by rigid-body transformation. Therefore, the rigid-body transformation matrix estimated as the second transformation matrix in step ST76 tends to provide the most favorable template matching result.

Subsequently, the ceiling map building device 10 determines whether there is a next keyframe (step ST77), and if there is (Yes), repeats the above procedure from step ST71. If it is determined that there is not a next keyframe in step ST77 (No), the ceiling map building device 10 performs a smoothing process on the scales of the keyframes arranged in order of the image capturing time thereof to remove abnormal scale values (step ST78). Here, a median filter is applied such that for a keyframe at a certain time t, an intermediate value of the scales of the keyframe at the time t and seven keyframes before and after the keyframe at the time t is adopted as the scale of the keyframe at time t. After the smoothing process is completed, the process is terminated.

Figure 15:
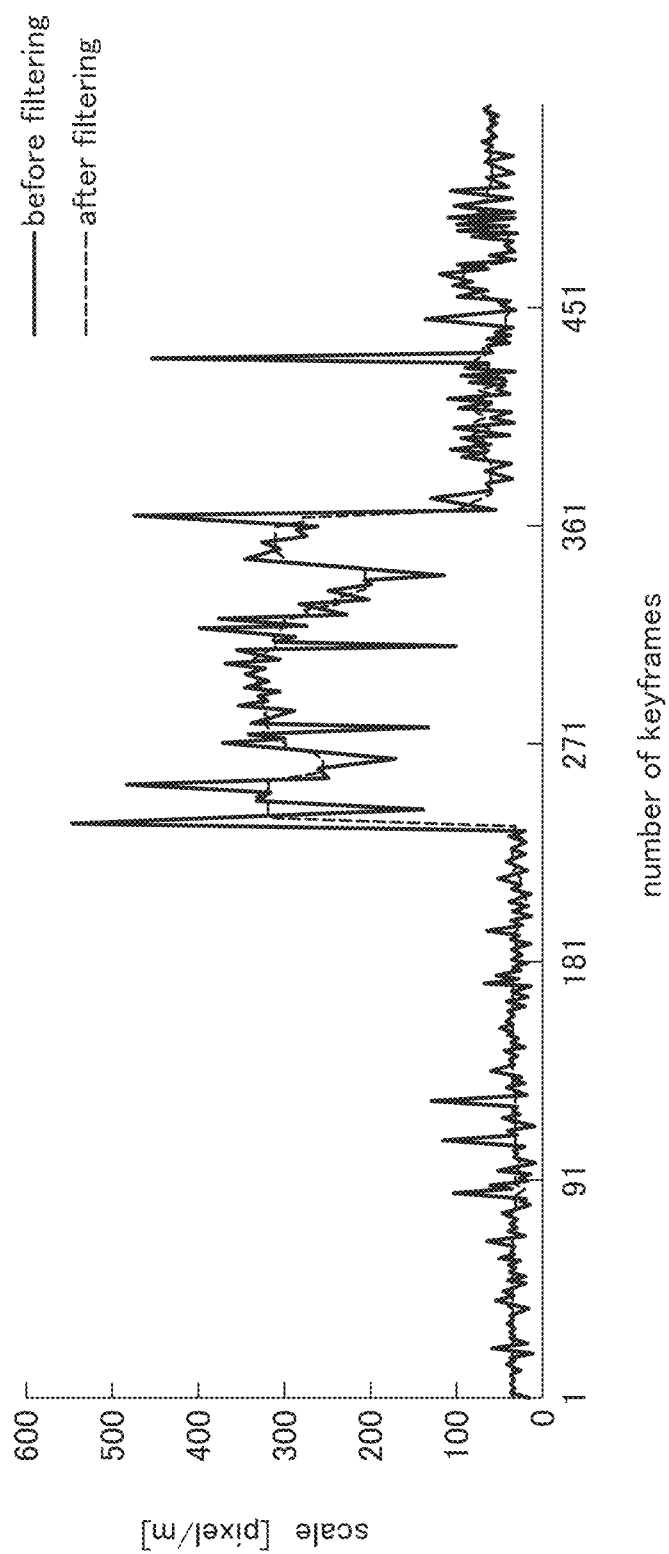
FIG. 15 is a graph showing an example of scale values before and after application of a median filter.

FIG. 15 is a graph showing an example of the scale values before and after application of the median filter. As shown in FIG. 15, by applying the median filter, the scale values are smoothed. This suppresses an error in the scale estimation and allows the ceiling images to be combined more smoothly.

<<Ceiling Panorama Map Building Process>>

Next, description will be made of the ceiling panorama map building process of step ST2 in FIG. 4. The ceiling panorama map building process is performed to build a single ceiling panorama map by pasting together the images (keyframes) adjusted based on the local scales of the keyframes. If the images having respective local scales are pasted together without size adjustment, coordinates in the world coordinate system and coordinates in the ceiling panorama map may not correspond to each other one-to-one. By resizing the images according to the local scales before pasting them together, it is possible to make coordinates in the world coordinate system and coordinates in the ceiling panorama map correspond to each other one-to-one; namely, to set the scale of each image, which represents how many pixels in the image correspond to one meter, to a uniform value.

Figure 16:
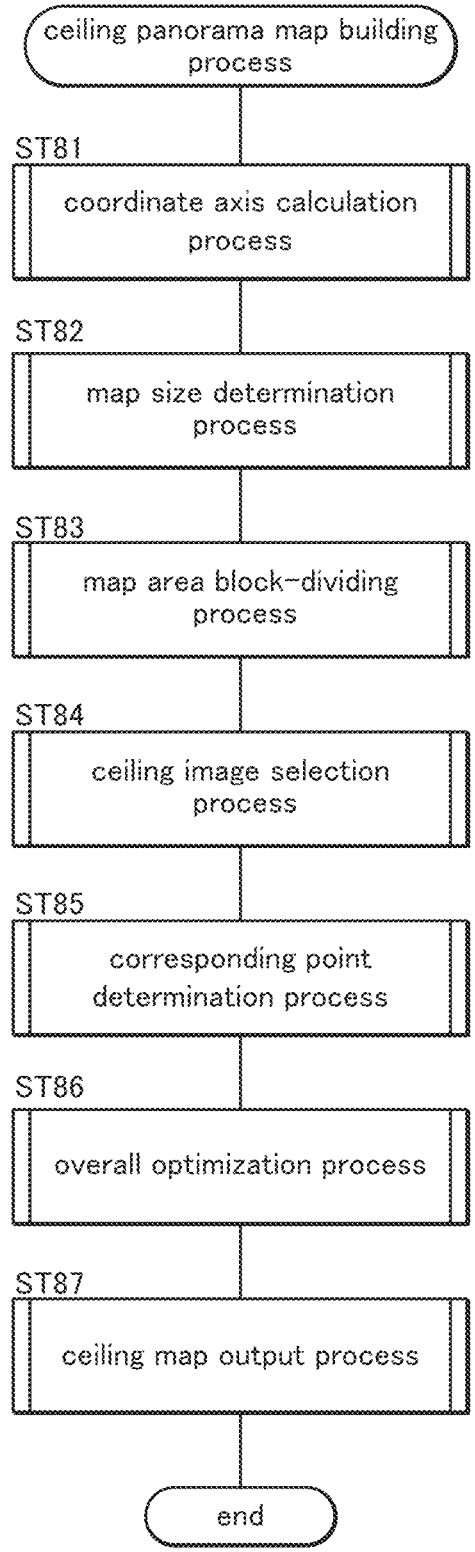
FIG. 16 is a flowchart showing a procedure of a ceiling panorama map building process.

FIG. 16 is a flowchart showing a procedure of the ceiling panorama map building process of step ST2. In the ceiling panorama map building process, the ceiling map building device 10 performs various processes shown in FIG. 16. Specifically, the ceiling map building device 10 performs: a coordinate axis calculation process for calculating a coordinate axis angular difference w between the ceiling map coordinate system and the world coordinate system (step ST81); a map size determination process for determining the size of the ceiling panorama map in the X direction and Y direction (step ST82); a map area block-dividing process for dividing an area of the ceiling panorama map into a plurality of blocks (step ST83); a ceiling image selection process for selecting the ceiling images to be pasted together to form the ceiling panorama map (step ST84); a corresponding point determination process for determining corresponding points between ceiling images having a covisibility relationship (step ST85); an overall optimization process for performing optimization based on bundle adjustment (step ST86); and a ceiling map output process (step ST87). Thereafter, the ceiling panorama map building process is terminated.

In the following, the processes in steps ST81 to ST87 will be described in detail.

<Coordinate Axis Calculation Process>

Figure 17:
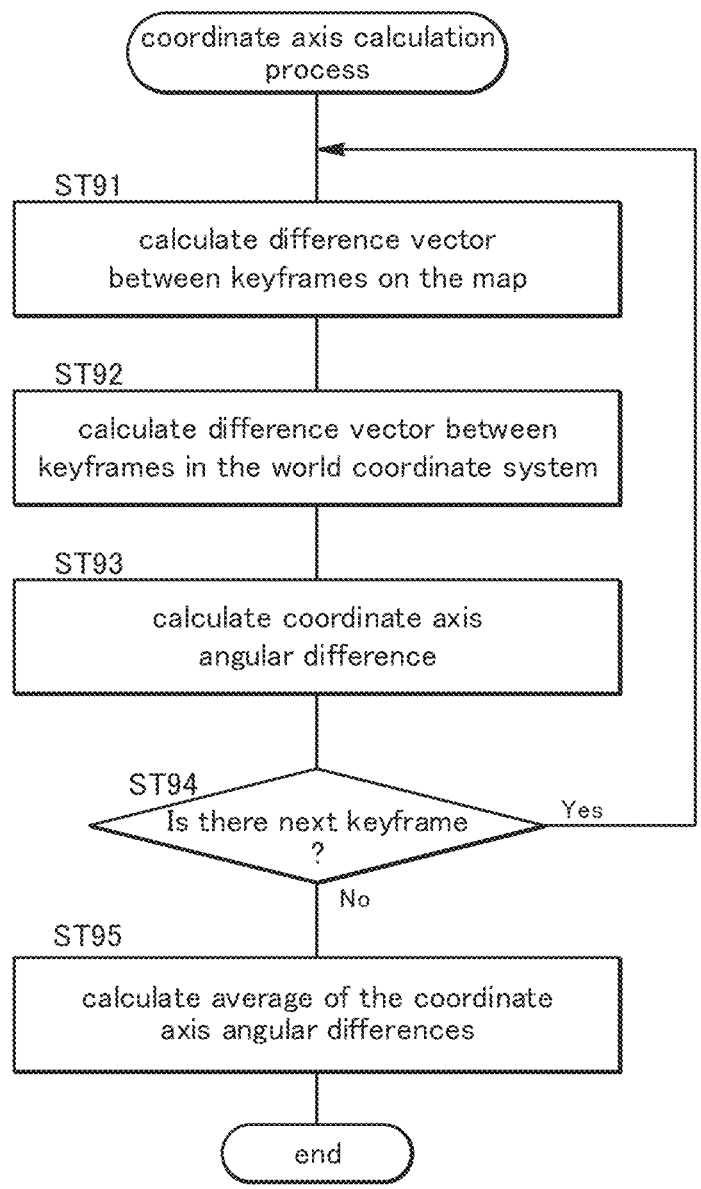
FIG. 17 is a flowchart showing a procedure of a coordinate axis calculation process.

FIG. 17 is a flowchart showing a procedure of the coordinate axis calculation process of step ST81 in FIG. 16. In the coordinate axis calculation process, the ceiling map building device 10 performs the following process for all of the keyframes in a time-sequential order following the procedure shown in FIG. 17. First, the ceiling map building device 10 calculates a two-dimensional difference vector $\Delta X_1$ between a coordinate of the image center of a current keyframe $KF_i$ on the map and a coordinate of the image center of an immediately prior keyframe $KF_{i-1}$ on the map (step ST91). It is to be noted that in the description, an arrow is not added to the reference sign representing a vector but an arrow is added in the following equation (7). Subsequently, the ceiling map building device 10 calculates a two-dimensional difference vector $\Delta x_1$ between a coordinate of the current keyframe $KF_i$ in the world coordinate system and a coordinate of the immediately prior keyframe $KF_{i-1}$ in the world coordinate system (step ST92). Thereafter, the ceiling map building device 10 calculates a coordinate axis angular difference $\omega_i$ obtained as an angle defined between a direction of the difference vector on the map and a direction of the difference vector in the world coordinate system, as shown by the following equation (7) (step ST93):

$$\omega_i = \cos^{-1}\left(\frac{\Delta \vec{X}_i \cdot \Delta \vec{x}_i}{\|\Delta \vec{X}_i\| \|\Delta \vec{x}_i\|}\right) \qquad (7)$$

Then, the ceiling map building device 10 determines whether there is a next keyframe (step ST94), and if there is (Yes), repeats the above procedure from step ST91, and if not (No), calculates an average of the angular differences $\omega_i$ obtained in steps ST91 to step ST93, so that the average is used as the coordinate axis angular difference w between the ceiling map coordinate system and the world coordinate system (step ST95). Then, the process is terminated.

<Map Size Determination Process>

Figure 18:
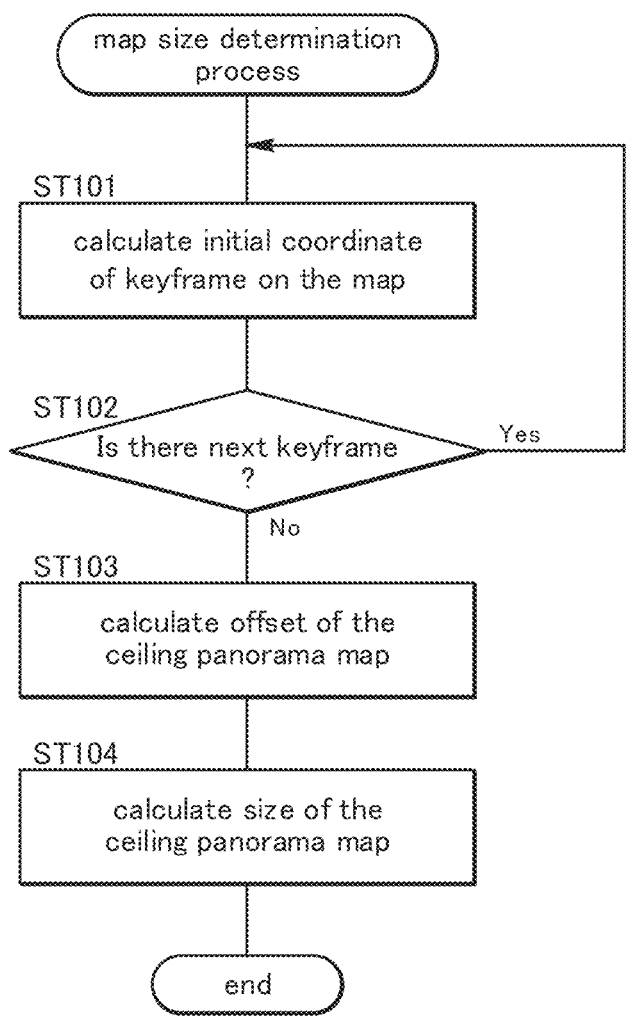
FIG. 18 is a flowchart showing a procedure of a map size determination process.

FIG. 18 is a flowchart showing a procedure of the map size determination process of step ST82 in FIG. 16. In the map size determination process shown in FIG. 18, the ceiling map building device 10 calculates an initial coordinate of a keyframe $KF_i$ on the ceiling map (ST101). The process of step ST101 is performed for the all keyframes in a time-sequential order, for example. Before step ST101, the ceiling map building device 10 searches for a minimum scale $s_{min}$ from the scales calculated for the all keyframes, and in step ST101, calculates the initial coordinate $(X_i^{ini},$ $Y_i^{ini}$) of the keyframe $KF_i$ by using the position information ($x_i$, $y_i$) thereof in the world coordinate system and the minimum scale $s_{min}$, by the following equation (8):

$$\begin{pmatrix} X_i^{ini} \\ Y_i^{ini} \end{pmatrix} = s_{min} \begin{pmatrix} x_i \\ y_i \end{pmatrix} \tag{8}$$

The ceiling map building device 10 determines whether there is a next keyframe (step ST102), and if there is (Yes), repeats the process of step ST101, and if not (No), obtains, from the initial coordinates of the all keyframes on the ceiling map, an X-direction minimum value $X_{min}^{ini}$, an X-direction maximum value $X_{max}^{ini}$, a Y-direction minimum value $Y_{min}^{ini}$, and a Y-direction maximum value $Y_{max}^{ini}$, and calculates an X-direction offset $X_{offset}$ and a Y-direction offset $Y_{offset}$ of the ceiling panorama map by the following equations (9) and (10) (step ST103):

$$X_{offset} = X_{min}^{ini} - 2B \tag{9}$$

$$Y_{offset} = Y_{min}^{ini} - 2B \tag{10}$$

where B represents a length of an offset of a block when the ceiling panorama map is block-divided. Thereafter, the ceiling map building device 10 calculates the size (width W and height H) of the ceiling panorama map in the ceiling map coordinate system by the following equations (11) and (12) (step ST104):

$$W = X_{max}^{ini} + 2B - X_{offset} = X_{max}^{ini} - X_{min}^{ini} + 4B \tag{11}$$

$$H = Y_{max}^{ini} + 2B - Y_{offset} = Y_{max}^{ini} - Y_{min}^{ini} + 4B \tag{12}$$

<Map Area Block-Dividing Process>

Figure 19:
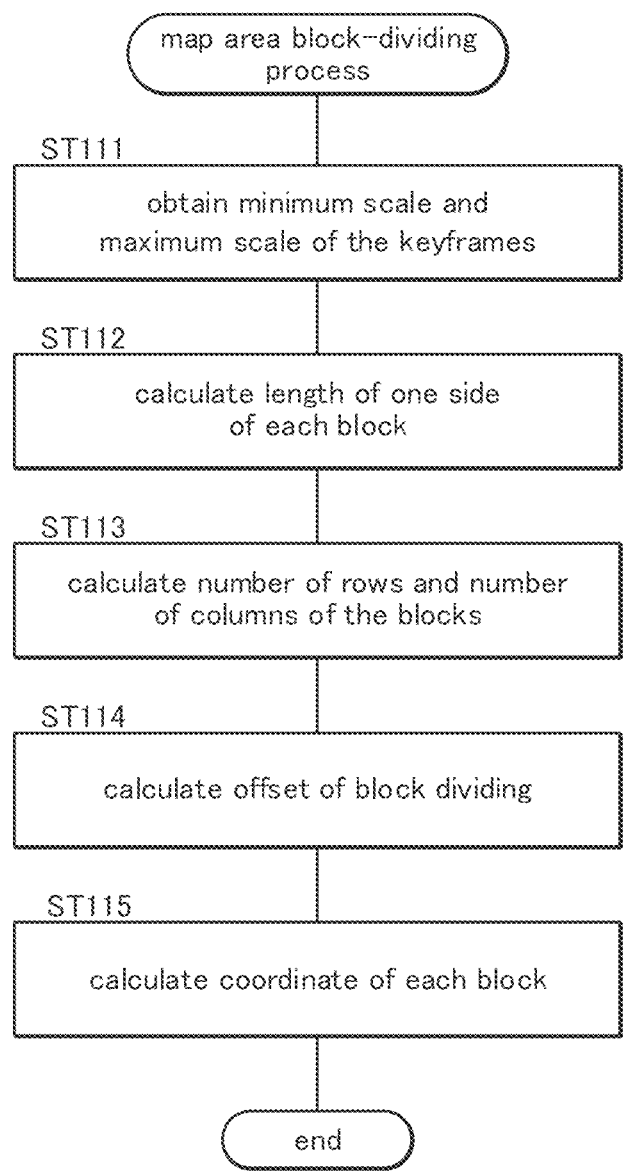
FIG. 19 is a flowchart showing a procedure of a map area block-dividing process for block-dividing an area of the ceiling panorama map.

FIG. 19 is a flowchart showing a procedure of the map area block-dividing process of step ST83 in FIG. 16. It is to be noted that in the present embodiment, it is assumed that each block has a same square shape, but in another embodiment, the blocks may have different shapes not limited to square. In the map area block-dividing process shown in FIG. 19, the ceiling map building device 10 obtains, from the local scales of the all keyframes, a minimum scale $s_{min}$ and a maximum scale $s_{max}$ (step ST111), and calculates a length $B_1$ [pixels] of one side of each block of the ceiling panorama map by the following equation (13) (step ST112):

$$B_l = \min\left(k_1 \frac{s_{min}}{s_{max}}, \frac{k_2}{s_{max}}\right) \tag{13}$$

where $k_1 = 1000$, $k_2 = 20000$, for example. If the length $B_1$ of one side of each block is inappropriately large, accuracy of own position estimation decreases undesirably at or around boundaries between the blocks, and therefore, the length $B_1$ of one side of each block should be in a range from 30 to 100, namely, if the length $B_1$ of one side of each block calculated by the above equation (13) is greater than the upper limit of 100, the length $B_1$ is rounded to 100, and if less than the lower limit of 30, the length $B_1$ is rounded to 30. Subsequently, the ceiling map building device 10 calculates a number of rows $B_{rows}$ and a number of columns $B_{cols}$ of the blocks based on the width W and the height H of the ceiling panorama map calculated in step ST104 of FIG. 18, as shown in the following equations (14) and (15) (step ST113):

$$B_{rows} = [H/B_1] \tag{14}$$

$$B_{cols} = [W/B_1] \tag{15}$$

where [ ] denotes Gaussian symbol. Thereafter, the ceiling map building device 10 calculates an offset ($B_{offset\_X}$, $B_{offset\_Y}$) representing an origin of the block dividing by the following equations (16) and (17) (step ST114):

$$B_{offset\_X} = [(W - B_{cols}B_1)/2] \tag{16}$$

$$B_{offset\_Y} = [(H - B_{rows}B_1)/2] \tag{17}$$

Lastly, the ceiling map building device 10 calculates the center coordinate of each block, with the offset ($B_{offset\_X}$, $B_{offset\_Y}$) calculated in step ST114 being the origin of the block dividing (step ST115).

<Ceiling Image Selection Process>

Figure 20:
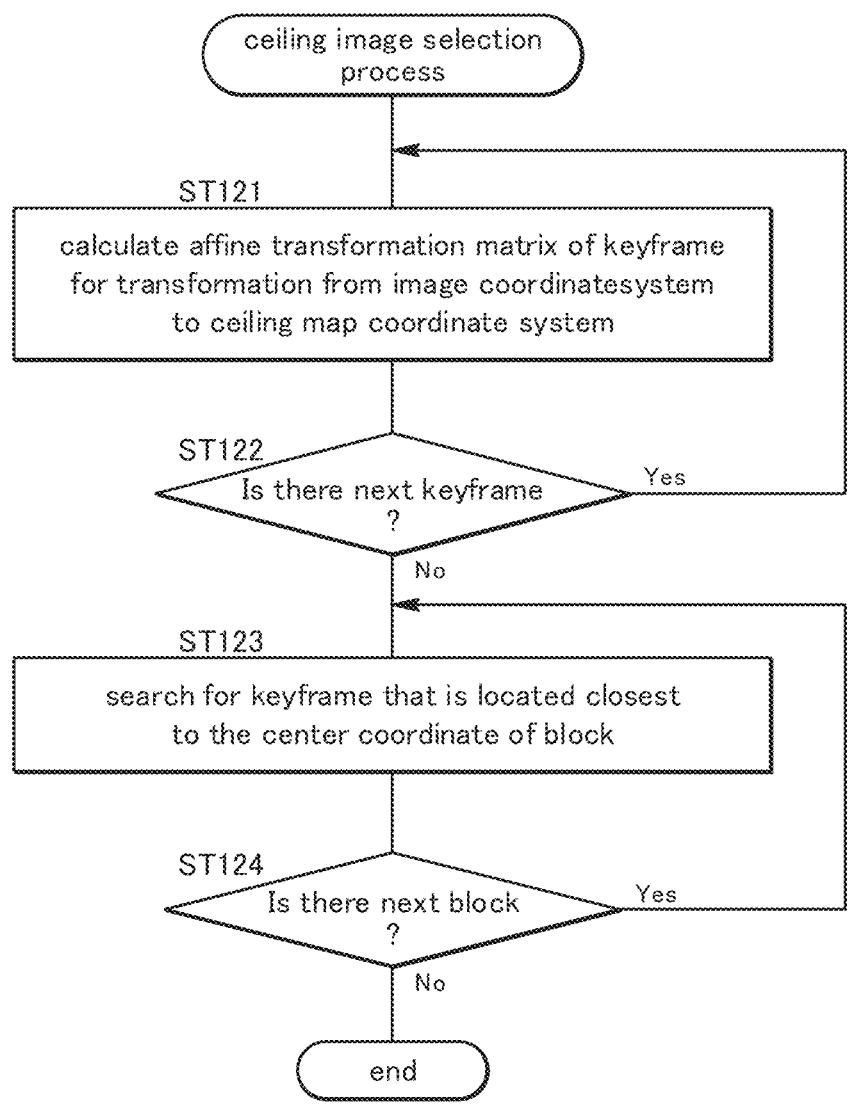
FIG. 20 is a flowchart showing a procedure of a ceiling image selection process for selecting the ceiling images to be combined to build the ceiling panorama map.

FIG. 20 is a flowchart showing a procedure of the ceiling image selection process of step ST84 in FIG. 16, in which ceiling images to be combined to build the ceiling panorama map are selected. In the ceiling image selection process, the ceiling map building device 10 searches for a keyframe belonging to each of the blocks by following the procedure of FIG. 20. First, the ceiling map building device 10 calculates an affine transformation matrix $A_i$ of a keyframe $KF_i$ for transformation from the image coordinate system to the ceiling map coordinate system by the following equation (18) (step ST121):

$$A_i \begin{pmatrix} S_i\cos(\theta_i + \omega) & -S_i\sin(\theta_i + \omega) & -X_c\cos(\theta_i + \omega) + Y_c\sin(\theta_i + \omega) + X_i^{ini} - X_{offset} \\ S_i\sin(\theta_i + \omega) & S_i\cos(\theta_i + \omega) & -X_c\sin(\theta_i + \omega) - Y_c\cos(\theta_i + \omega) + Y_i^{ini} - Y_{offset} \\ 0 & 0 & 1 \end{pmatrix} \tag{18}$$

where $S_i$ represents a scale ratio provided by $s_{min}/s_i$, and $\theta_i$ represents the orientation of the mobile body 4 provided by the orientation information. This process is performed for the all keyframes. Thus, the ceiling map building device 10 determines whether there is a next keyframe in the following step ST122, and if there is (Yes), repeats the above process of step ST121 for the next keyframe. Thereby, the ceiling images of the all keyframes are converted in accordance with the respective scales to have sizes suitable for the ceiling map coordinate system, which is a coordinate system of the ceiling panorama map.

If it is determined in step ST122 that there is not a next keyframe (No), the ceiling map building device 10 searches for and retrieves a keyframe that is located closest to the center coordinate of a block when subjected to the transformation of step ST121, as an image to be pasted onto the block (step ST123). This process is performed for the all blocks. Thus, the ceiling map building device 10 determines whether there is a next block in the following step ST124, and if there is (Yes), repeats the above process of step ST123 for the next block, and if not (No), terminates the process.

Thus, the ceiling map building device 10 divides the ceiling panorama map into a plurality of blocks in step ST83, calculates an affine transformation matrix $A_i$ for transformation of i-th ceiling image (or keyframe) from the image coordinate system to the ceiling map coordinate system in step ST121, and retrieves, for each block of the ceiling panorama map, a ceiling image that is located closest to the center coordinate of the block in step ST123. By pasting thus-retrieved ceiling images onto the respective blocks, portions of the ceiling images whose shooting direction is near vertical are combined, whereby a ceiling panorama map with a reduced distortion is built.

<Corresponding Point Determination Process>

Figure 21:
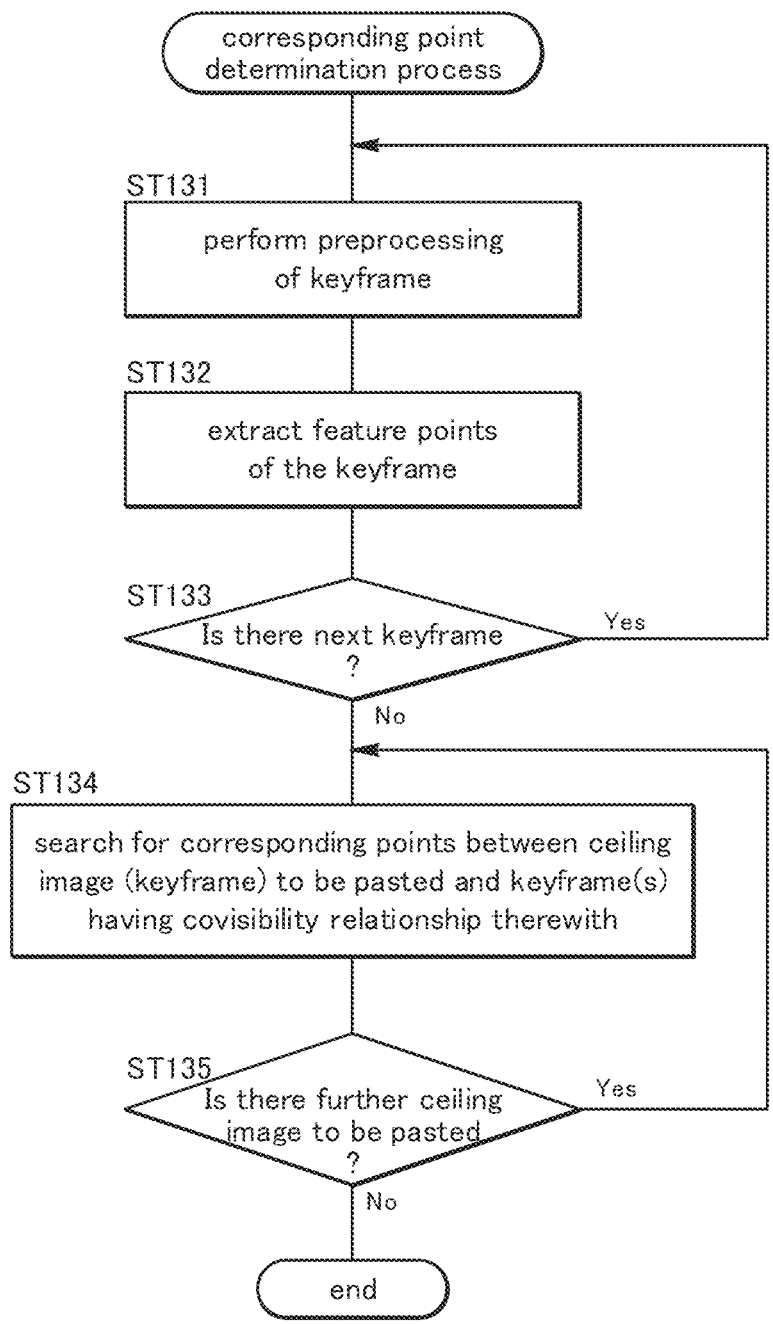
FIG. 21 is a flowchart showing a procedure of a corresponding point determination process for determining corresponding points between ceiling images having a covisibility relationship.

FIG. 21 is a flowchart showing a procedure of the corresponding point determination process of step ST85 in FIG. 16 for determining corresponding points between ceiling images having a covisibility relationship. In the corresponding point determination process, the ceiling map building device 10 determines corresponding points between each of the keyframes to be pasted to build the ceiling map and the keyframe having a covisibility relationship therewith, by following the procedure of FIG. 21. First, the ceiling map building device 10 performs preprocessing of a keyframe in the manner as described in relation to step ST42 of FIG. 9 (step ST131), and performs ORB feature point extraction for the preprocessed keyframe (step ST132). These processes are performed for the all keyframes. Thus, the ceiling map building device 10 determines whether there is a next keyframe in the next step ST133, and if there is (Yes), repeats the above procedure from step ST131. If it is determined in step ST133 that there is not a next keyframe (No), the ceiling map building device 10 searches for and determines corresponding points between the feature points of a ceiling image (keyframe) to be pasted and the feature points of the keyframe(s) having a covisibility relationship therewith (step ST134). Thereafter, the ceiling map building device 10 determines whether there is a further ceiling image to be pasted (step ST135), and if there is (Yes), repeats the process of step ST134, and if not (No), terminates the process.

<Overall Optimization Process>

Figure 22:
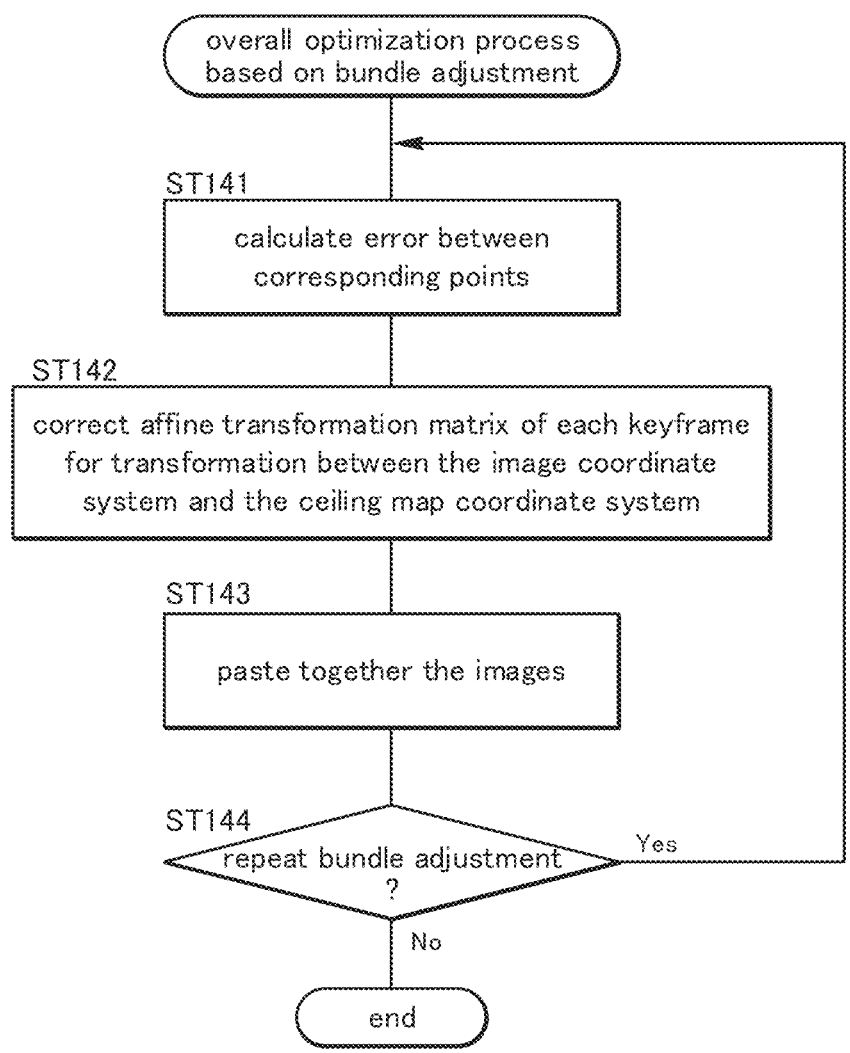
FIG. 22 is a flowchart showing a procedure of an overall optimization process based on bundle adjustment.

FIG. 22 is a flowchart showing a procedure of the overall optimization process of step ST86 in FIG. 16 for performing optimization based on bundle adjustment. In the overall optimization process, bundle adjustment is performed on the affine transformation matrix Ai of each keyframe obtained in step ST121 of FIG. 20, to thereby simultaneously optimize a position information error and a local scale estimation error. It is to be noted that the bundle adjustment may be performed by a known method disclosed in E. Rublee, V. Rabuad, K. Konolige, G. Bradsk, "Visual-inertial monocular SLAM with map reuse," 2016 or B. Triggs, P. F. McLauchlan, R. I. Hartley, A. W. Fitzgibbon, "Bundle adjustment a modern synthesis," 2000, for example.

In the ceiling map building process using a large number of ceiling images, a time period required for performing one bundle adjustment becomes long, and therefore, it is preferred to set the number of repetitions of bundle adjustment performed by a program (e.g., twenty times) in the settings file for ceiling map building. The ceiling map building device 10 performs the overall optimization process based on bundle adjustment by following the procedure shown in FIG. 22. Specifically, the ceiling map building device 10 calculates an error in the ceiling map coordinate system between a keyframe $KF_i$ and a keyframe $KF_j$ having a covisibility relationship with the keyframe $KF_i$ (step ST141). More specifically, when k-th corresponding points of the keyframe $KF_i$ and the keyframe $KF_j$ are denoted by $p_{ik}$ and $p_{jk}$, respectively, the ceiling map building device 10 calculates an error in the ceiling map coordinate system between these keyframes by the following equation (19):

$$\varepsilon(i, j) = \sum_k \|A_i \rho_{ik} - A_j \rho_{jk}\|^2 \qquad (19)$$

Subsequently, the ceiling map building device 10 calculates an affine transformation matrix $A_i$ for transformation from the image coordinate system to the ceiling map coordinate system that minimizes a total sum E of the errors of the keyframes calculated in step ST141, by the following equation (20) based on Levenberg-Marquardt method:

$$\operatorname*{argmin}_{A_i} E = \operatorname*{argmin}_{A_i} \sum_i \sum_{j \neq i} \varepsilon(i, j) \qquad (20)$$

Here, the components of the affine transformation matrix calculated in step ST121 of FIG. 20 are used as initial values of the affine transformation matrix Ai, and, for the affine transformation matrix of each keyframe, six parameters given by the following equation (21) are updated (step ST142).

$$A_i = \begin{pmatrix} a_{11} & a_{12} & a_{13} \\ a_{21} & a_{22} & a_{23} \\ 0 & 0 & 1 \end{pmatrix} \qquad (21)$$

Thereafter, the ceiling map building device 10 applies the affine transformation matrix updated in step ST142 to the keyframe to be pasted, and pastes the keyframe onto the block to which the keyframe belongs by cropping it into the region of the block (step ST143). This is performed for the all blocks, and thereby, one bundle adjustment is finished. Subsequently, the ceiling map building device 10 determines whether the bundle adjustment needs to be repeated (whether the bundle adjustment has been performed a number of times specified in the settings file for ceiling map building) (step ST144), and if it does (Yes), repeats the above procedure from step ST141, and if not (No), terminates the process.

Figure 23:
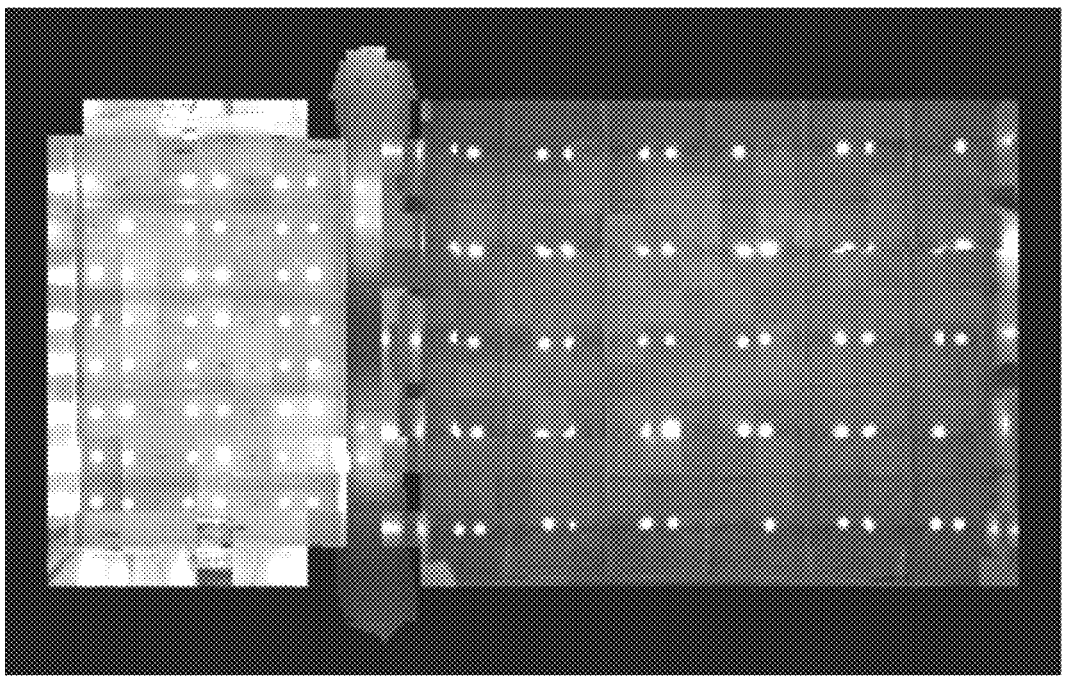
FIG. 23 is a diagram showing an example of a ceiling panorama map after bundle adjustment.

FIG. 23 shows an example of a ceiling panorama map after the bundle adjustment. As shown, a ceiling image is pasted onto each block so as to be continuous to the neighboring ceiling images.

<Ceiling Map Output Process>

FIG. 24 is a flowchart showing a procedure of the ceiling map output process of step ST87 in FIG. 16. In the ceiling map output process, the ceiling map building device 10 outputs information related to the ceiling map necessary for own position estimation by following the procedure shown in FIG. 24. Specifically, the ceiling map building device 10 outputs a ceiling map information file describing basic information of the ceiling map (step ST151), outputs a keyframe information file describing information of the keyframes used in the ceiling panorama map (step ST152), and outputs the image data of the ceiling panorama map as a ceiling map image file (step ST153). Then, the process is terminated.

As described in the foregoing, in the ceiling map building method of the embodiment of the present embodiment, a scale is estimated for each ceiling image (keyframe) based on information of the ceiling image and another ceiling image including a same object as included in the ceiling image (or another ceiling image having a covisibility relationship with the ceiling image) in step ST16 of FIG. 5, and the ceiling images are converted in accordance with the respective scales so as to have sizes suitable for the ceiling panorama map and the converted ceiling images are pasted together to form a ceiling map in step ST84 of FIG. 16, which is a part of the ceiling panorama map building process in step ST2 of FIG. 4. Thereby, it is possible to build a ceiling map by combining the ceiling images produced by capturing images of the ceiling 5 by the single camera 6 even when the distance to the ceiling 5 is not known beforehand.

Further, the ceiling map building device 10 of the present embodiment is configured to obtain a plurality of ceiling images and position information of the camera 6 when the ceiling images were captured, estimate a scale of each ceiling image (keyframe) based on information of the ceiling image and another ceiling image including a same object as included in the ceiling image (or another ceiling image having a covisibility relationship with the ceiling image) in step ST16 of FIG. 5, convert the ceiling images in accordance with the respective scales so as to have sizes suitable for the ceiling panorama map, and to paste together the converted ceiling images to build a ceiling map in step ST84 of FIG. 16, which is a part of the ceiling panorama map building process in step ST2 of FIG. 4. Thereby, it is possible to build a ceiling map by combining the ceiling images produced by capturing images of the ceiling 5 by the single camera 6 even when the distance to the ceiling 5 is not known beforehand.

Further, the ceiling map building program of the present embodiment, when executed by the ceiling map building device 10 implemented by a computer, causes the ceiling map building device 10 to obtain a plurality of ceiling images and position information of the camera 6 when the ceiling images were captured, estimate a scale of each ceiling image (keyframe) based on information of the ceiling image and another ceiling image including a same object as included in the ceiling image (or another ceiling image having a covisibility relationship with the ceiling image) in step ST16 of FIG. 5, convert the ceiling images in accordance with the respective scales so as to have sizes suitable for the ceiling panorama map, and to paste together the converted ceiling images to build a ceiling map in step ST84 of FIG. 16, which is a part of the ceiling panorama map building process in step ST2 of FIG. 4. Thereby, it is possible to build a ceiling map by combining the ceiling images produced by capturing images of the ceiling 5 by the single camera 6 even when the distance to the ceiling 5 is not known beforehand.

The ceiling map built to have a uniform scale as described above can be used when the mobile body 4 moving on the floor surface 2 estimates the own position. For example, when the mobile body 4 equipped with the single camera 6 moves on the floor surface 2, the mobile body 4 may obtain ceiling images so as to include ceiling images having a covisibility relationship, estimate the scale in the same manner as when building the ceiling map, convert the ceiling image so as to have a scale identical with that of the ceiling map, and searches for a portion of the ceiling map identical with or similar to the converted ceiling map to thereby estimate the own position on the ceiling map.

The concrete embodiment of the present invention has been described in the foregoing, but the present invention is not limited to the above embodiment and various modifications are possible. For instance, the concrete structure, position, number, angle, etc. of each member or part may be changed as appropriate within the scope of the present invention. Not all of the structural elements shown in the above embodiment are necessarily indispensable and they may be selectively used as appropriate.

The invention claimed is:

1. A ceiling map building method for building a ceiling map, comprising:
   acquiring a plurality of ceiling images produced by capturing images of a ceiling with a camera while the camera is moved along a floor surface, and position information associated with each ceiling image, the position information indicating a position of the camera when the ceiling image was captured;
   estimating a scale of each ceiling image based on information related to the ceiling image and information related to another ceiling image including a same object as included in the ceiling image, the scale being represented as a ratio of an amount of movement of the object between the two ceiling images to an amount of movement of the camera between the positions thereof when the two ceiling images were respectively captured; and
   building the ceiling map by converting the plurality of ceiling images in accordance with the respective scales so as to have sizes suitable for the ceiling map and combining the converted ceiling images.

2. The ceiling map building method as claimed in claim 1, wherein the estimating of the scale comprises:
   performing four kinds of scale estimation for each ceiling image based on matching between each ceiling image and the other ceiling image including the same object as included in the ceiling image using respective transformation matrices; and
   selecting, as the scale, a scale obtained by one of the multiple kinds of scale estimation associated with the transformation matrix that provides a highest template matching score.

3. The ceiling map building method as claimed in claim 2, wherein the plurality of scale estimation includes scale estimation using a homography matrix estimated by use of a result of corresponding point matching of local feature points.

4. The ceiling map building method as claimed in claim 2, wherein the plurality of scale estimation includes scale estimation using a rigid-body transformation matrix estimated by use of a result of corresponding point matching of local feature points.

5. The ceiling map building method as claimed in claim 2, wherein the plurality of scale estimation includes scale estimation using a translational transformation matrix estimated by use of template matching.

6. The ceiling map building method as claimed in claim 2, wherein the plurality of scale estimation includes scale estimation using an inter-image translational transformation matrix based on the scale of an immediately prior ceiling image.

7. The ceiling map building method as claimed in claim 1, wherein the estimating of the scale comprises performing a smoothing process on the scales of the plurality of ceiling images arranged in a time-sequential order with respect to image capturing times thereof.

8. The ceiling map building method as claimed in claim 1, wherein the building of the ceiling map comprises:
   dividing an area of the ceiling map into a plurality of blocks;
   calculating an affine transformation matrix of each ceiling image for transformation from an image coordinate system to a ceiling map coordinate system; and pasting, to each block of the ceiling map, a ceiling image that is located closest to a center coordinate of the block when subjected to transformation by the affine transformation matrix.

9. A ceiling map building device for building a ceiling map, comprising a processor and a memory storing instructions that, when executed by the processor, cause the processor to perform operations comprising:

acquiring a plurality of ceiling images produced by capturing images of a ceiling with a camera while the camera is moved along a floor surface, and position information associated with each ceiling image, the position information indicating a position of the camera when the ceiling image was captured;

estimating a scale of each ceiling image based on information related to the ceiling image and information related to another ceiling image including a same object as included in the ceiling image, the scale being represented as a ratio of an amount of movement of the object between the two ceiling images to an amount of movement of the camera between the positions thereof when the two ceiling images were respectively captured; and building the ceiling map by converting the plurality of ceiling images in accordance with the respective scales so as to have sizes suitable for the ceiling map and combining the converted ceiling images.

10. A non-transitory computer readable storage medium storing a ceiling map building program for building a ceiling map, wherein, when executed by a computer, the program causes the computer to perform operations comprising:

acquiring a plurality of ceiling images produced by capturing images of a ceiling with a camera while the camera is moved along a floor surface, and position information associated with each ceiling image, the position information indicating a position of the camera when the ceiling image was captured;

estimating a scale of each ceiling image based on information related to the ceiling image and information related to another ceiling image including a same object as included in the ceiling image, the scale being represented as a ratio of an amount of movement of the object between the two ceiling images to an amount of movement of the camera between the positions thereof when the two ceiling images were respectively captured; and building the ceiling map by converting the plurality of ceiling images in accordance with the respective scales so as to have sizes suitable for the ceiling map and combining the converted ceiling images.

* * * * *